(12) United States Patent
Keesler

(10) Patent No.: US 6,418,608 B2
(45) Date of Patent: Jul. 16, 2002

(54) CONVERTIBLE FLANGE INSERTION MACHINE

(75) Inventor: Glenn R. Keesler, Hamilton, IN (US)

(73) Assignee: Rieke Corporation, Auburn, IN (US)

(*) Notice: Subject to any disclaimer, the term of this patent is extended or adjusted under 35 U.S.C. 154(b) by 0 days.

(21) Appl. No.: 09/779,405

(22) Filed: Feb. 8, 2001

Related U.S. Application Data

(60) Provisional application No. 60/222,245, filed on Aug. 1, 2000.

(51) Int. Cl.[7] ............................. B21D 39/03; B32P 11/00
(52) U.S. Cl. ............................. 29/430; 29/429; 29/509; 29/512; 29/38.9; 29/787; 29/773; 198/836.1
(58) Field of Search ........................... 29/429, 430, 509, 29/512, 561, 38.9, 565, 787, 788, 773; 198/836.1, 735.3; 193/35 C

(56) References Cited

U.S. PATENT DOCUMENTS

| | | | |
|---|---|---|---|
| 3,571,891 A | | 3/1971 | Roberts |
| 3,628,231 A | | 12/1971 | Pancook |
| 3,683,482 A | * | 8/1972 | Gluchowski |
| 3,791,021 A | | 2/1974 | Bauman |
| 3,800,401 A | | 4/1974 | Jesevich et al. |
| 3,874,058 A | | 4/1975 | Jesevich et al. |
| 3,945,230 A | | 3/1976 | Tomioka et al. |
| 4,189,824 A | | 2/1980 | Dillon et al. |
| 4,400,963 A | | 8/1983 | Epps |
| 4,587,830 A | | 5/1986 | Mills |
| 4,677,730 A | * | 7/1987 | Mineo et al. |
| 4,718,161 A | | 1/1988 | Pfister et al. |
| 4,776,200 A | | 10/1988 | Fabbri |
| 5,177,862 A | | 1/1993 | Speece |
| 5,220,819 A | | 6/1993 | Scheib et al. |
| 5,301,401 A | | 4/1994 | Finzer |
| 5,425,692 A | | 6/1995 | Matsuda |
| 5,943,757 A | | 8/1999 | Magley |

\* cited by examiner

Primary Examiner—S. Thomas Hughes
Assistant Examiner—Eric B. Compton
(74) Attorney, Agent, or Firm—Woodard, Emhardt, Naughton, Moriarty & McNett

(57) ABSTRACT

A convertible flange insertion machine for the insertion of a pair of internally threaded flanges into a drum head of a shipping container is disclosed. The machine includes a pair of continuously moving drum head conveyor chains running along conveyor supports and between a pair of tooling dies that upon compression insert flanges into the drum head. A pair of flange conveyors run along side the drum head conveyor and include a pair of side rails with two lips for guiding the lips of flanges according to two different flange styles. The flange conveyors terminate at a lateral transfer mechanism. One lateral transfer mechanism includes an indexer with two pawls that sequentially indexes flanges in a two step procedure over a pair of spring loaded stops and into the receiving pocket of a tooling block. The tooling block places the flanges over the tooling die where a release assembly forces the flanges out of the tooling block and onto the die. Another lateral transfer mechanism includes an indexer that directly indexes flanges laterally off a floor to be dropped into the die, and the indexer includes a flange engaging portion that holds the trailing edge of the flange to prevent the flange from tipping while it drops into the die. The drum head is placed over the flanges and the die portions compress, which lowers the conveyor supports and causes the drum head to come to rest on the lower die portion, and insert the flanges into the drum head. The machine is operable in both a one-step and two-step flange insertion procedure.

53 Claims, 26 Drawing Sheets

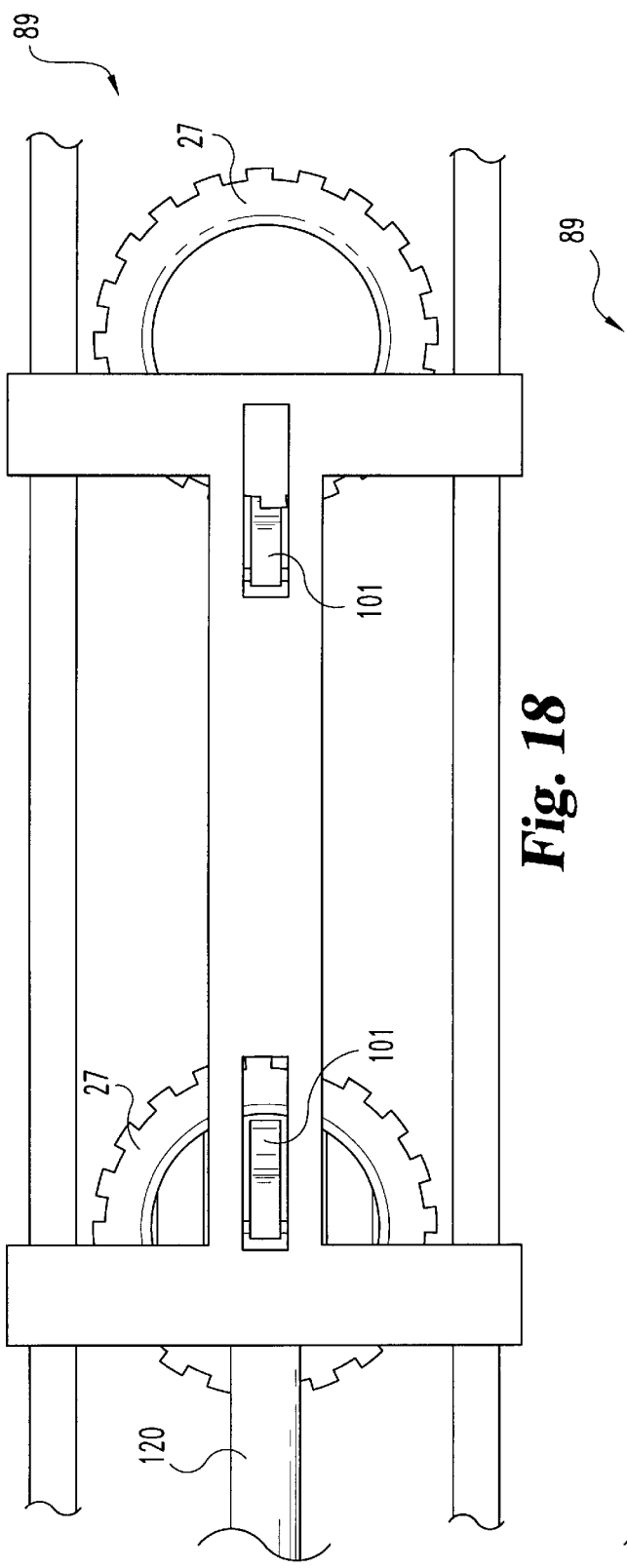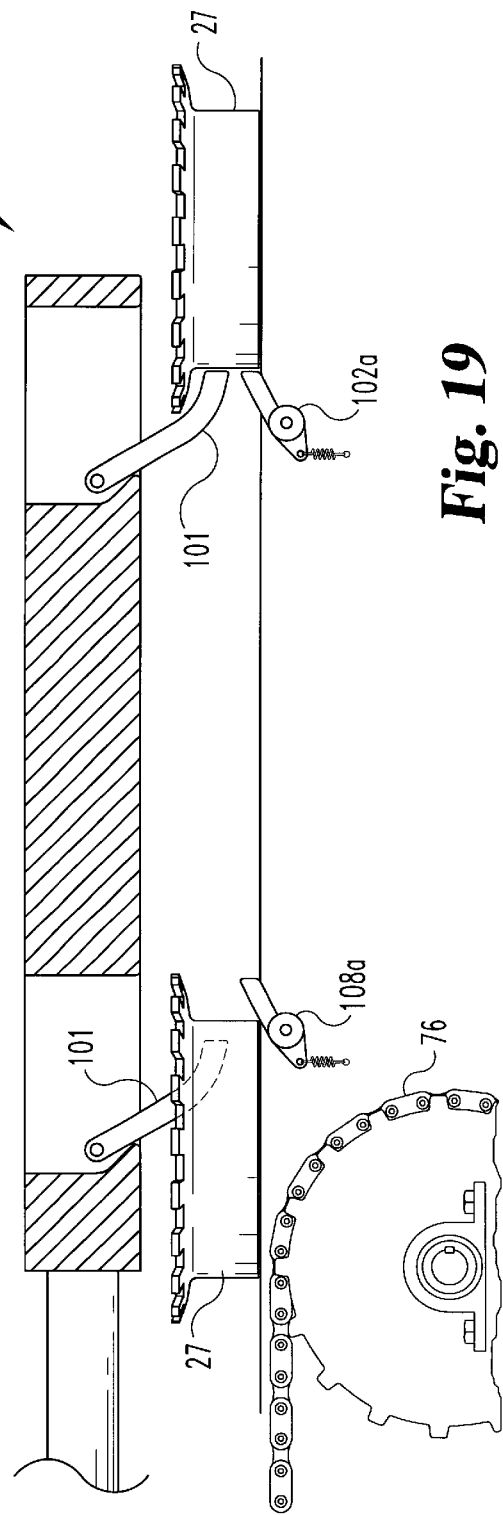
Fig. 18
Fig. 19

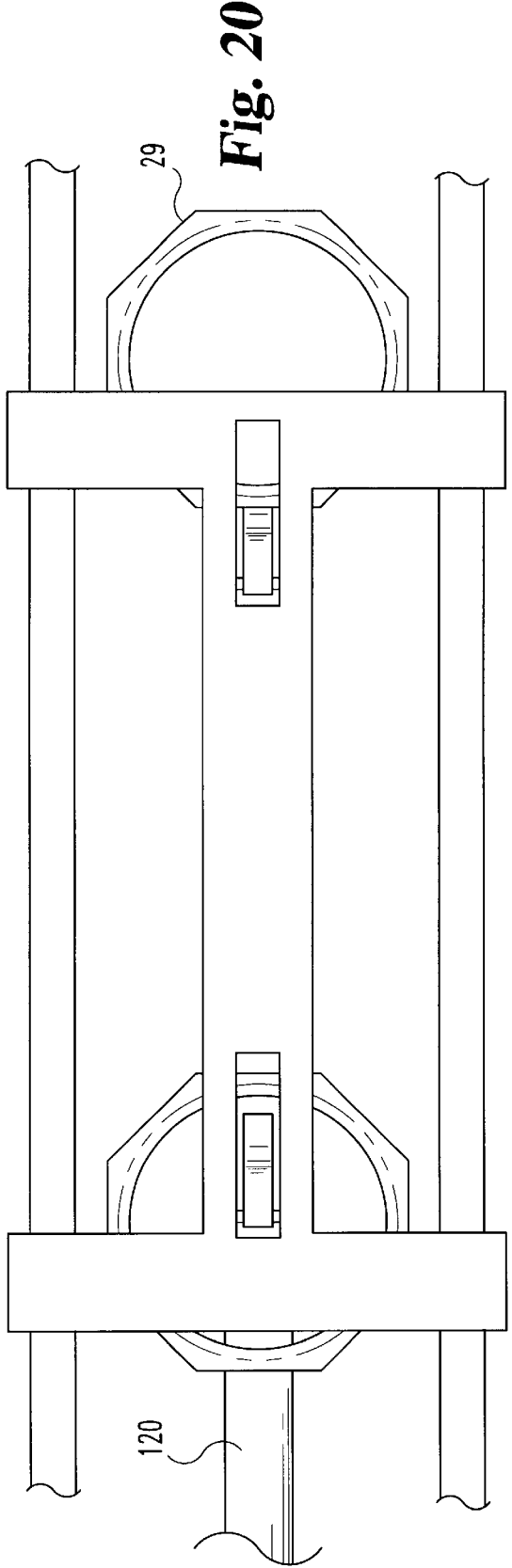
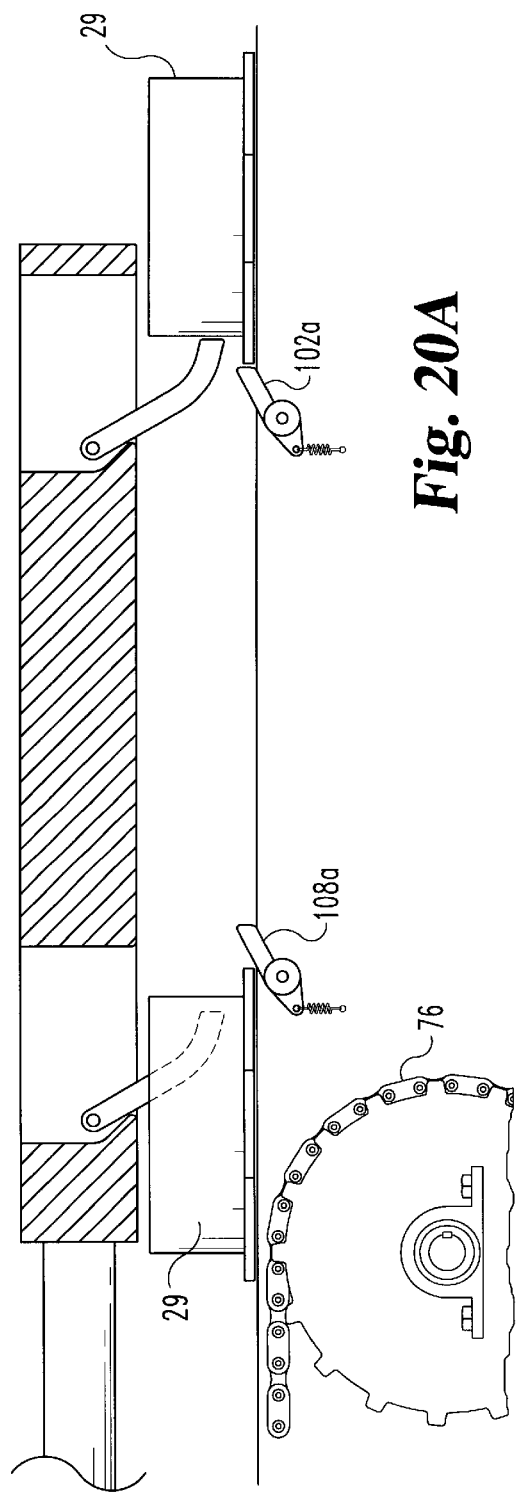

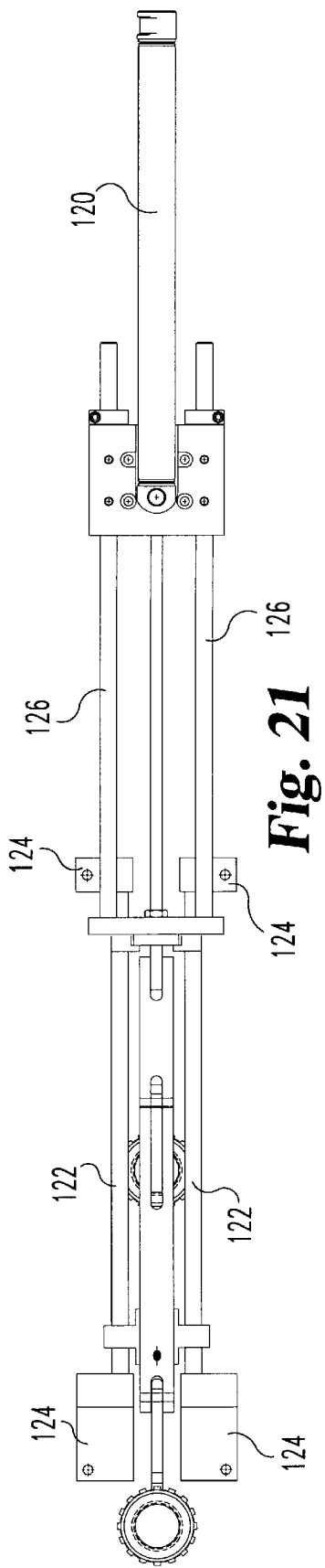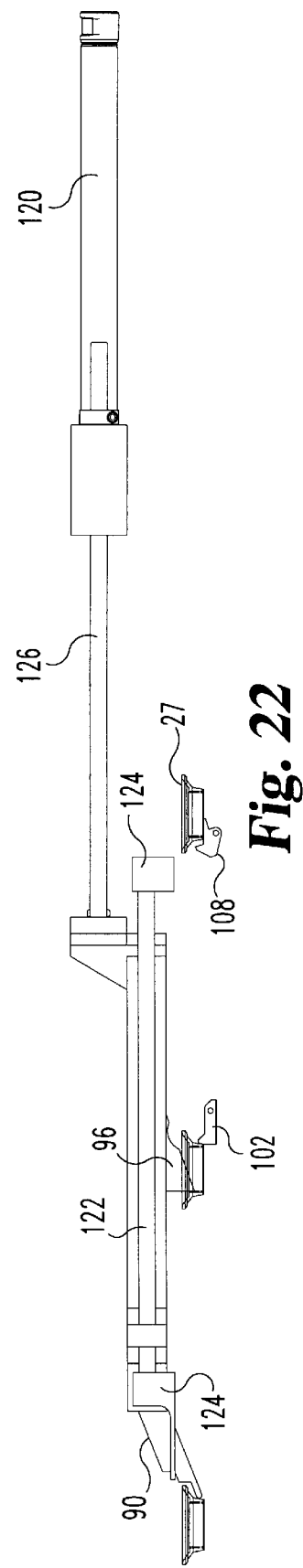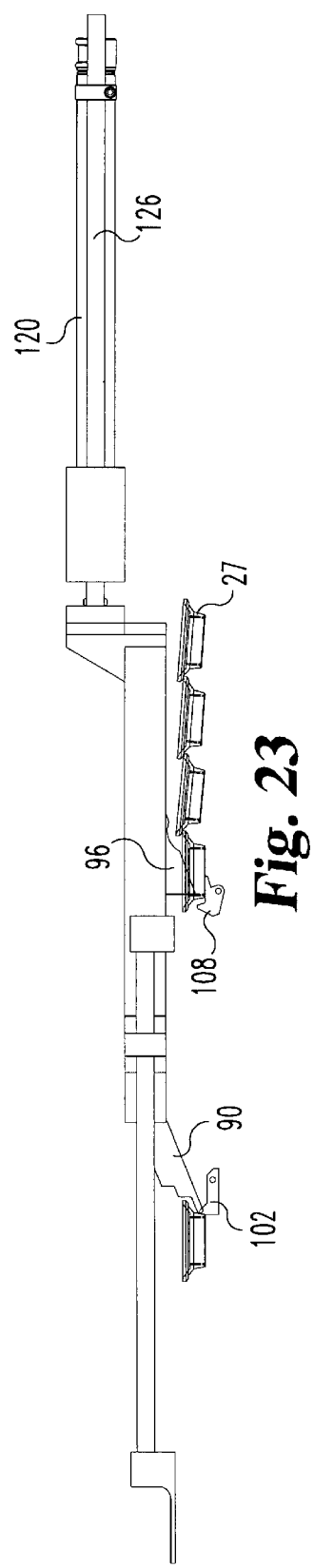

CONVERTIBLE FLANGE INSERTION MACHINE

CROSS-REFERENCE TO RELATED APPLICATION

This application is a continuation in part of U.S. Provisional Patent Application Ser. No. 60/222,245, filed Aug. 1, 2000, the disclosure of which is hereby incorporated by reference.

BACKGROUND OF THE INVENTION

The present invention relates in general to flange insertion machinery for the internally-threaded flanges which are installed into metal drum heads. More specifically the present invention relates to such flange insertion machinery which is "convertible" so as to be able to handle a Type I (octagonal base) flange in one machinery configuration and a Type II (serrated lip) flange in a second machinery configuration. The "convertible" nature of the machinery of the present invention also extends to its use as part of a one-step insertion procedure in one mode and as part of a two-step insertion procedure in another mode.

Large, metal, drum-like containers, which are used for the shipping and storage of liquid substances, are typically fabricated with a metal drum end or head which is attached to a substantially cylindrical drum body. The contents of such containers will at some point in their life cycle need to be dispensed or emptied from the container. In order to facilitate this dispensing or emptying function and in some instances to facilitating filling, internally-threaded flanges are installed into the drum head. Since the thickness of the metal used for the drum head will not support a sufficient number of threads for proper threaded engagement, flanges which have an increased axial height are inserted so that an externally-threaded closing plug can be used. Most drums or containers of the type described use a ¾ inch flange and cooperating plug for venting and a 2 inch outlet flange and cooperating plug for dispensing as well as for filling the container if the container is going to be recycled for reuse.

Over the years the metal drum industry has typically used two flange styles. What has become generally known as a Type I flange has an octagonal base and a raised cylindrical body which is internally threaded. The style of flange is illustrated herein by FIG. 4. The other flange style which is frequently used is what has become generally known as a Type II flange. This style of flange has an upper serrated lip and depending therefrom a generally cylindrical body which is internally threaded. This style of flange is illustrated herein by FIG. 5. The Type I style is basically the same whether in the ¾ inch vent configuration or in the 2 inch outlet configuration. Likewise, the Type II style of flange is basically the same whether in the ¾ inch vent configuration or in the 2 inch outlet configuration. Type I and Type II flanges including details of their insertion into drum heads are described more particularly in U.S. Pat. No. 5,943,757 to Magley, U.S. Pat. No. 3,791,021, to Bauman, U.S. Pat. No. 3,800,401 to Jesevich et al., U.S. Pat. No. 3,874,058 to Jesevich et al., and application Ser. No. 09/444,198 entitled Tamper-Evident Drum Closure Overcap and assigned to the same assignee of the present invention, each of which are hereby incorporated by reference in their entireties.

Due in part to the size and weight of these drums, especially when filled with liquid, the installation of the flanges needs to be performed in a manner that results in a strong, durable connection and creates a connection that is leak-free. In order to achieve this type of connection, the drum head is pierced to create an opening and then formed with a drawn and contoured receiving pocket. Then, in cooperation with suitable insertion machinery and corresponding insertion dies which are designed for the specific flange size and style, the flanges are locked into position in the drum head.

The drum head must be initially pierced for the starting clearance hole for the ¾ inch vent flange and another starting hole for the 2 inch outlet flange. A receiving pocket is then formed (drawn) around each of the corresponding pierced holes. The drawn or formed pocket has a first style for a Type I flange and a second style for a Type II flange. It is also to be understood that the pierced holes and formed pockets for each flange can be provided as part of the drum heads before these drum heads are actually delivered to the insertion machine of the present invention. At the insertion machine, the flanges are inserted (i.e., installed and anchored in position). This procedure is what is referred to and will be referred to herein as a two-step procedure. The first step is the piercing and forming. The second step is the flange insertion (into the formed pocket) and then crimping the pocket in and around the flange so as to anchor the flange in position.

It is also an option to perform the flange insertion task as a one-step procedure. In the one-step procedure, the drum head is delivered to the insertion machine without any pierced holes and without any formed pockets. Each drum head is delivered to the insertion station of the machine at which point the tooling and dies perform all elements of the task in rapid succession and all at the same location with compound tooling. The requisite hole is pierced, the metal of the head around the pierced hole is formed into a receiving pocket, the flange is inserted, and the metal formed around the pierced hole is then crimped in and around the flange so as to lock the flange in position.

For the Type I style of flange, the drawn pocket receives the octagonal base and a raised cylindrical wall is drawn at the inner edge of the pocket. The drawn pocket is crimped around the octagonal base so as to anchor that base to the drum head and prevent relative motion between the two. The cylindrical body of the flange telescopes inside of the raised cylindrical wall and is formed over the upper edge of the raised cylindrical wall. This style of final assembly is illustrated herein in FIGS. 6 and 7. It will be noted that by inserting the flange into the pocket from a direction that coincides with the inside of the drum, the flange cannot pull out. The formed over (lip) of the cylindrical body onto the raised cylindrical wall prevents push out of the flange into the interior of the drum. The crimping of the formed metal pocket around the octagonal base prevents any rotational movement of the flange relative to the drum head.

For the Type II style of flange, the drawn pocket receives the serrated lip and the cylindrical body of the flange extends into what will become the interior of the drum. The drawn pocket is crimped into and beneath the various serrations. Since there is a portion of the drawn pocket which extends over the upper surface of the serrated lip, the flange is securely anchored against push in, pull out, or rotation. The final assembly of this Type II style of flange into the pocket of the drum head is illustrated in FIGS. 8 and 9.

In view of the differences in the two most common styles of drum head flanges, and in view of the different drum head configurations and tooling which are required, it is not surprising that the flange insertion machinery, in use before the present invention, was typically dedicated to one style of flange. Consequently, one option in order to run both styles of flanges is to have two separate insertion machines. Another option might be to run two parallel flange lines, each dedicated to a single flange style, as part of the same machine, but the cost and complexity of this approach could be prohibitive. With any automated and conveyorized design which would typically be used for high volume production, the cost of a single insertion machine is substantial. Drum manufacturers and drum head manufacturers need to have the capability of handling both styles of flanges so that they can compete for all jobs, regardless of the flange style which might be specified. If only one insertion machine is available, then that company can only compete for work for the corresponding one style of flange.

In view of the foregoing, it would be an improvement and a benefit to be able to run the two styles of flanges (Type I and Type II) on a single machine with only minimal component substitutions. While there would be some added cost for these part substitutions, this added cost is far less than the added cost to provide an entire second machine in order to be able to handle a second style of flange.

Since any significant production volume of drum heads with flanges installed must be run in an automated manner in order to be cost effective, there will typically be some type of a loading station for the flanges and for the drum heads and very likely a conveyor arrangement. In lieu of a conveyor arrangement, a rotary table might be configured to automate this process. However, in a conveyor arrangement which is believed to be the most efficient, it is important to guide the flanges and maintain proper travel and orientation of those flanges so as to avoid "piggy backing", a situation where flanges become bunched and actually ride up and over, or underneath, the immediately adjacent flange in a downstream direction. "Piggy backing" can lead to imprecise placement and handling of the flanges as well as machine jams and various other problems in a typical flange insertion process and machine.

In order to try and preclude the problems associated with "piggy backing", in one embodiment the present invention utilizes side rails to hold and guide the flanges to substantially reduce or eliminate flange "piggy backing". However, if these side rails have to be changed as one of the aforementioned component part substitutions in order to handle the two styles of flanges, the time to convert over and the associated cost could substantially offset the savings of using only one machine. The concern with the side rail is the amount of time which would be required to change the side rails from a Type I configuration to a Type II configuration. If two separate machines are used, then the labor time to convert from one flange style to the other is eliminated. Consequently, if the labor time needed to convert a single machine back and forth between the two flange styles become excessive, the cost savings attributable to using only a single machine will be diminished. Since the conveyor portion of the machine including the side rails requires a substantial time investment to convert back and forth between the two flange styles, it would be an improvement to the convertible machine concept of the present invention to be able to use a single style of side rail that is configured to handle either style of flange. As part of the present invention, a novel convertible flange insertion machine including this single style of side rail is provided, adding to the novelty and unobviousness of the present invention.

Moreover, in another embodiment of the present invention, a novel convertible flange insertion machine with a pusher mechanism is provided. The pusher mechanism of the present invention can be used in conjunction with or as an alternative to the side rails for the prevention of "piggy-backing." In one embodiment, the pusher mechanism is constructed and arranged to accommodate two styles of flanges with minimal adaptation. In another embodiment, the pusher mechanism accommodates two styles of flanges without making any substantial adjustment to the pusher mechanism to index the flanges into position for placement into the drum heads. In yet another embodiment, the pusher mechanism accommodates flanges that are in a relatively "piggy-backed" configuration and provides relatively error free handling and exact placement for any flange in a typical flange insertion machine. In yet another embodiment, the pusher mechanism has a formed first pusher member adapted to engage a first flange style at a first position and a second flange style at a second position to index the flanges to a desired specified location regardless of the style of flange used. Since extensive interchange or adjustments to an indexing apparatus to convert between two flange styles would involve a substantial time investment, it would be an improvement to the convertible machine concept of the present invention to be able to use a single indexer that is configured to handle either style of flange. As a part of the present invention, a convertible flange insertion machine with this pusher mechanism is provided, adding to the novelty and unobviousness of the present invention.

SUMMARY OF THE INVENTION

The present invention comprises a novel apparatus for the insertion of internally threaded flanges into the drum head of a shipping container In one embodiment the apparatus is convertible from running a first flange style to running a second flange style without making substantial structural changes to the machine when converting between flange styles.

In another embodiment a convertible flange insertion machine comprises a first conveyor for transport of a drum head to a flange insertion station, a second conveyor for transport of a flange to the flange insertion station, a tooling arrangement comprising a portion of the flange insertion station and including an upper tooling portion located on one side of the drum head and a lower tooling portion located on an opposite side of the drum head when the drum head is located at the flange insertion station, wherein at least one of the upper and lower tooling portions is constructed and arranged to move toward the drum head and to install a flange into the drum head, and wherein the second conveyor includes a side rail which is constructed and arranged to guide the flange to the flange insertion station, the side rail having a first guiding portion designed to accommodate a first style of flange and having a second guiding portion to accommodate a second style of flange, the side rail being suitable for two different styles of flange without needing to be modified.

A convertible, flange insertion machine for the installation of an internally-threaded flange into a drum head of a shipping container is also provided comprising a first conveyor for transport of a drum head to a flange insertion station, a second conveyor for transport of a flange to the flange insertion station, a tooling arrangement including an upper tooling portion located on one side of the drum head and a lower tooling portion located on an opposite side of the drum head when the drum head is located at the flange insertion station for inserting flanges into the drum head, and an indexing arrangement for sequentially advancing flanges for insertion between the upper and lower tooling portions and comprising a portion of the flange insertion station, where the indexing arrangement accommodates two different flange styles without the need to make any structural changes to the indexing arrangement when converting the machine from running a first flange style to running a second flange style.

In another embodiment, a convertible flange and drum head delivery machine for the delivery of internally-threaded flanges for insertion into a drum head of a shipping container is provided including a drum head conveyor, a flange conveyor that is adapted to transport flanges according to two different flange styles, a tooling arrangement for inserting flanges into drum heads that includes an upper tooling portion located on one side of the drum head and a lower tooling portion located on an opposite side of the drum head when the drum head is located at the flange insertion station, an indexing arrangement located along the flange conveyor for sequentially advancing flanges for insertion between the upper and lower tooling portions, a tooling block driver for operating assemblies to inserting flanges between the upper and lower tooling portions, wherein the flange delivery machine is convertible from running a first flange style to running a second flange style without needing any structural changes to the conveyors.

In another embodiment, a convertible flange and drum head delivery machine for the delivery of internally-threaded flanges for insertion into a drum head of a shipping container is provided including a drum head conveyor, a flange conveyor that is adapted to transport flanges according to two different flange styles, a tooling arrangement for inserting flanges into drum heads that includes an upper tooling portion located on one side of the drum head and a lower tooling portion located on an opposite side of the drum head when the drum head is located at the flange insertion station, an indexing arrangement located along the flange conveyor for sequentially advancing flanges for insertion between the upper and lower tooling portions, a tooling block driver for operating assemblies to inserting flanges between the upper and lower tooling portions, wherein the flange delivery machine is convertible from running a first flange style to running a second flange style without needing any structural changes to the indexing arrangement.

In a fifth embodiment, a convertible flange and drum head delivery machine for the delivery of internally-threaded flanges for insertion into a drum head of a shipping container is provided including a drum head conveyor, a flange conveyor that is adapted to transport flanges according to two different flange styles, a tooling arrangement for inserting flanges into drum heads that includes an upper tooling portion located on one side of the drum head and a lower tooling portion located on an opposite side of the drum head when the drum head is located at the flange insertion station, an indexing arrangement located along the flange conveyor for sequentially advancing flanges for insertion between the upper and lower tooling portions, a tooling block driver for operating assemblies to inserting flanges between the upper and lower tooling portions, wherein the flange delivery machine is convertible from running a first flange style to running a second flange style without needing any structural changes to the tooling block driver.

A sixth embodiment of the invention provides a method of installing internally threaded flanges into the drum head of a shipping container and includes providing a drum head conveyor and a flange conveyor for transporting a drum head and two different style flanges to a flange insertion station, providing a tooling arrangement at the flange insertion station for inserting flanges into the drum head, transporting a drum head to the flange insertion station, transporting a flange according to a first flange style to the flange insertion station on the flange conveyor, placing the first flange into the tooling arrangement, inserting the flange into the drum head, transporting a flange according to a second flange style to the flange insertion station on the flange conveyor, placing the second flange into the tooling arrangement, inserting the second flange into a drum head with the tooling arrangement.

One object of the present invention is to provide an improved, convertible, flange insertion machine.

Related objects and advantages of the present invention will be apparent from the following description.

BRIEF DESCRIPTION OF THE DRAWINGS

FIG. 18 is a top plan view of an indexing mechanism sequencing Type II flanges along their conveyor track according to the present invention.

FIG. 19 is a side elevational view in full section of an indexing mechanism sequencing Type II flanges along their conveyor track according to the present invention.

FIG. 20 is a top plan view of an indexing mechanism sequencing Type I flanges along their conveyor track according to the present invention.

FIG. 20A is a side elevational view in full section of an indexing mechanism sequencing Type I flanges along their conveyor track according to the present invention.

FIG. 21 is a top plan view of an indexing mechanism sequencing flanges according to another embodiment of the present invention.

FIG. 22 is a side elevational view of the FIG. 21 indexing mechanism in a downstream extended position.

FIG. 23 is a side elevational view of the FIG. 21 indexing mechanism in an upstream retracted position.

DESCRIPTION OF THE PREFERRED EMBODIMENT

Figure 1:
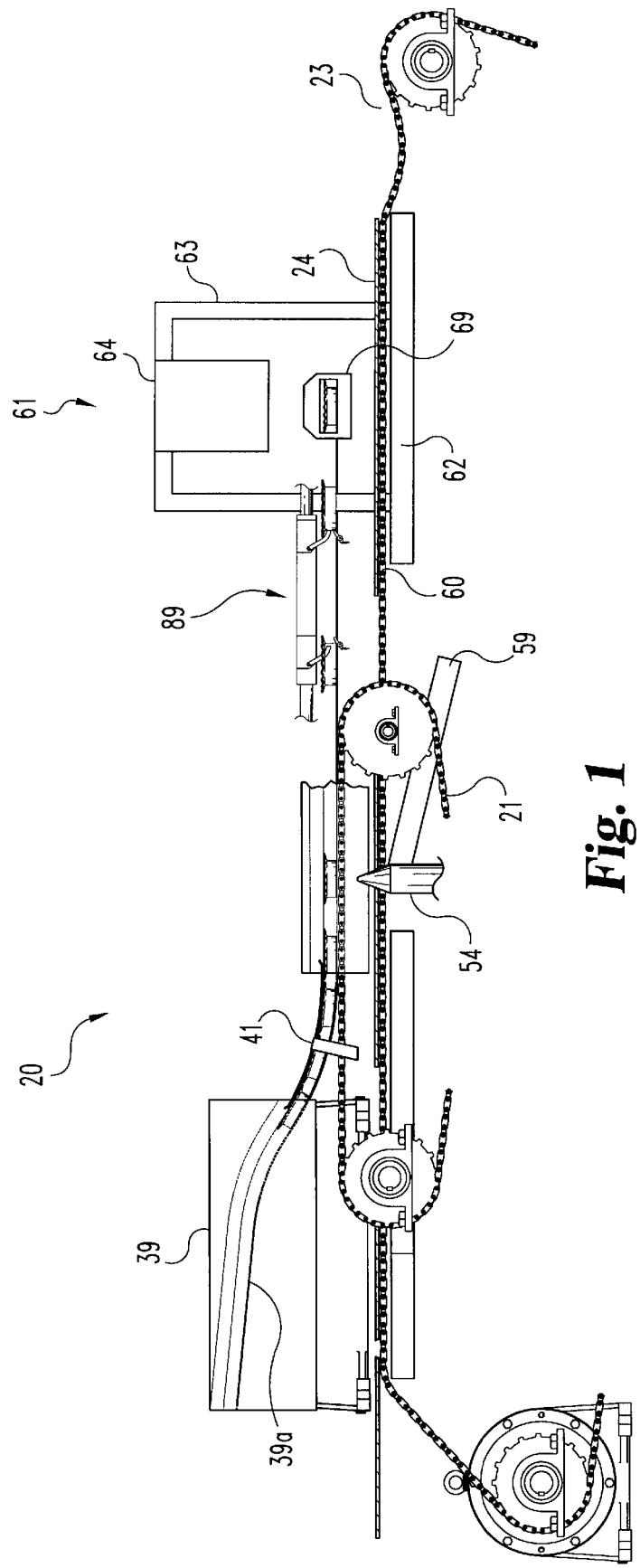
FIG. 1 is a diagrammatic, side elevational view of a convertible flange insertion machine according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
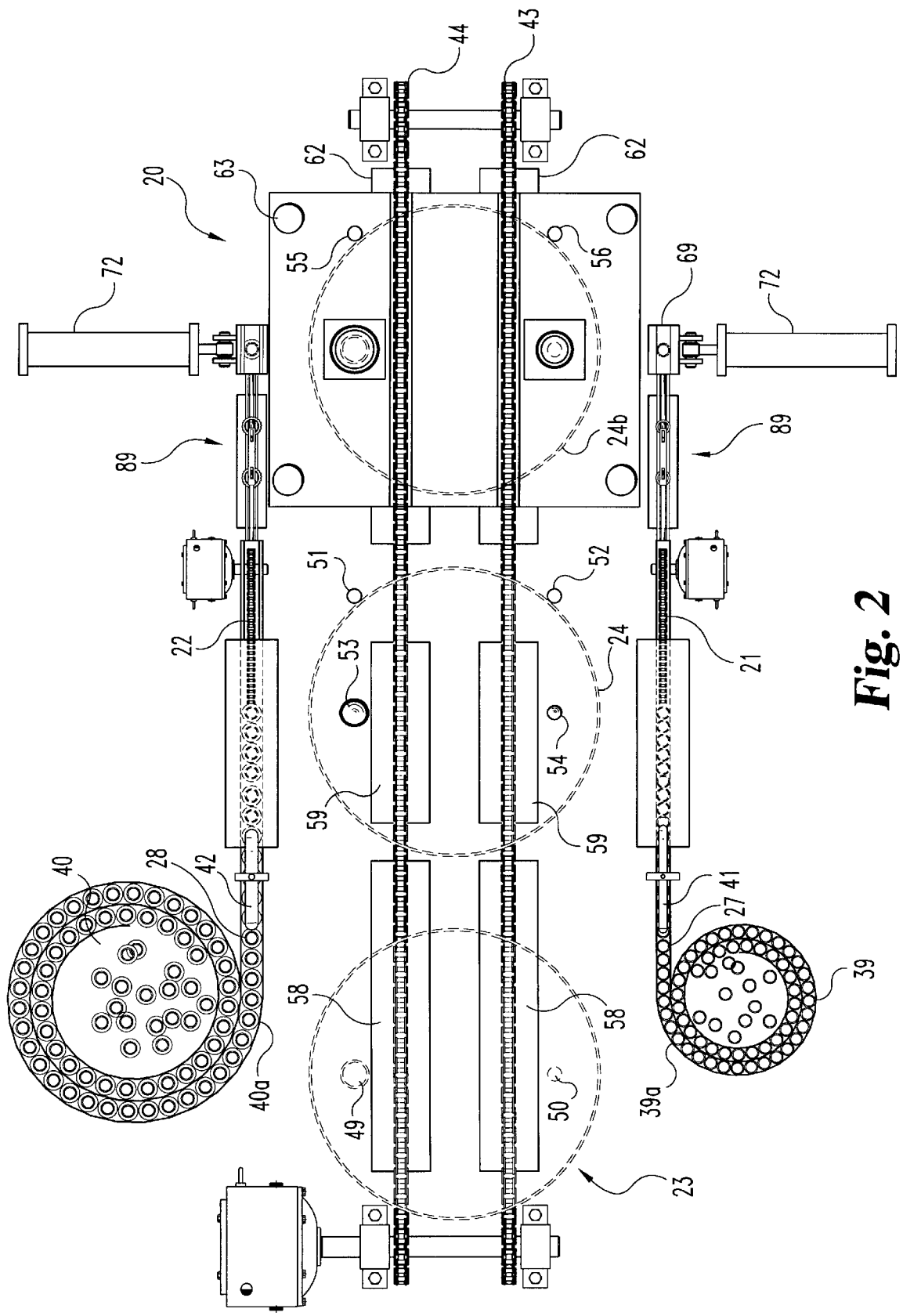
FIG. 2 is a diagrammatic, top plan view of the FIG. 1 flange insertion machine.
Figure 3:
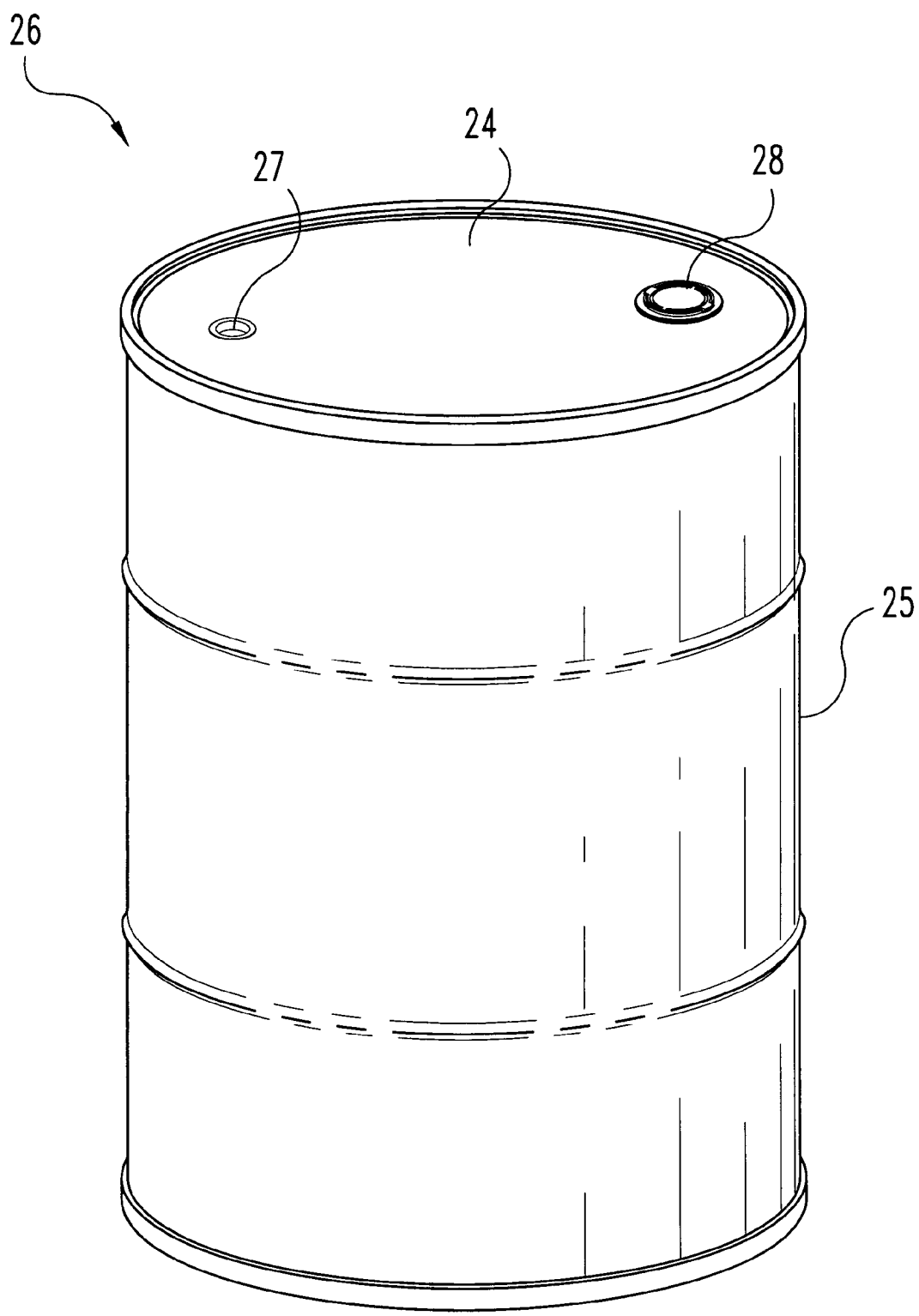
FIG. 3 is a perspective view of a fabricated drum including a drum head with a vent flange and an outlet flange installed therein according to the present invention.

Referring to FIGS. 1 and 2, there is diagrammatically illustrated a convertible, flange insertion machine 20 which includes two conveyor lines 21 and 22 for two different flange sizes and a conveyor line 23 for the corresponding style of drum head (i.e., lid) which receives one each of the two different flange sizes. With continuing reference to FIGS. 1 and 2 and with reference to FIG. 3, the drum head 24 is secured to the cylindrical body 25 of a large metal shipping container or drum 26 after the two flanges are installed in the drum head. The typical flange sizes for this style of shipping container 26 or drum include a ¾ inch vent opening flange 27 (and flange 29 in FIG. 26A) and a 2 inch dispensing opening or outlet flange 28 (and flange 30 in FIG. 27A). The purpose of these flanges is to establish an internally-threaded opening for receipt of corresponding closing plugs. The metal thickness of the drum head is not sufficient to provide an adequate number of threads if internally threaded in order to receive and securely retain the desired closing plugs. Since a majority of these types of shipping container are intended for interstate, over-the-road transmit, there are Department of Transportation (DOT) tests and standards which must be met. In order to do so, it is important that the closing plugs be securely held in position and not leak under even extreme conditions.

Figure 4:
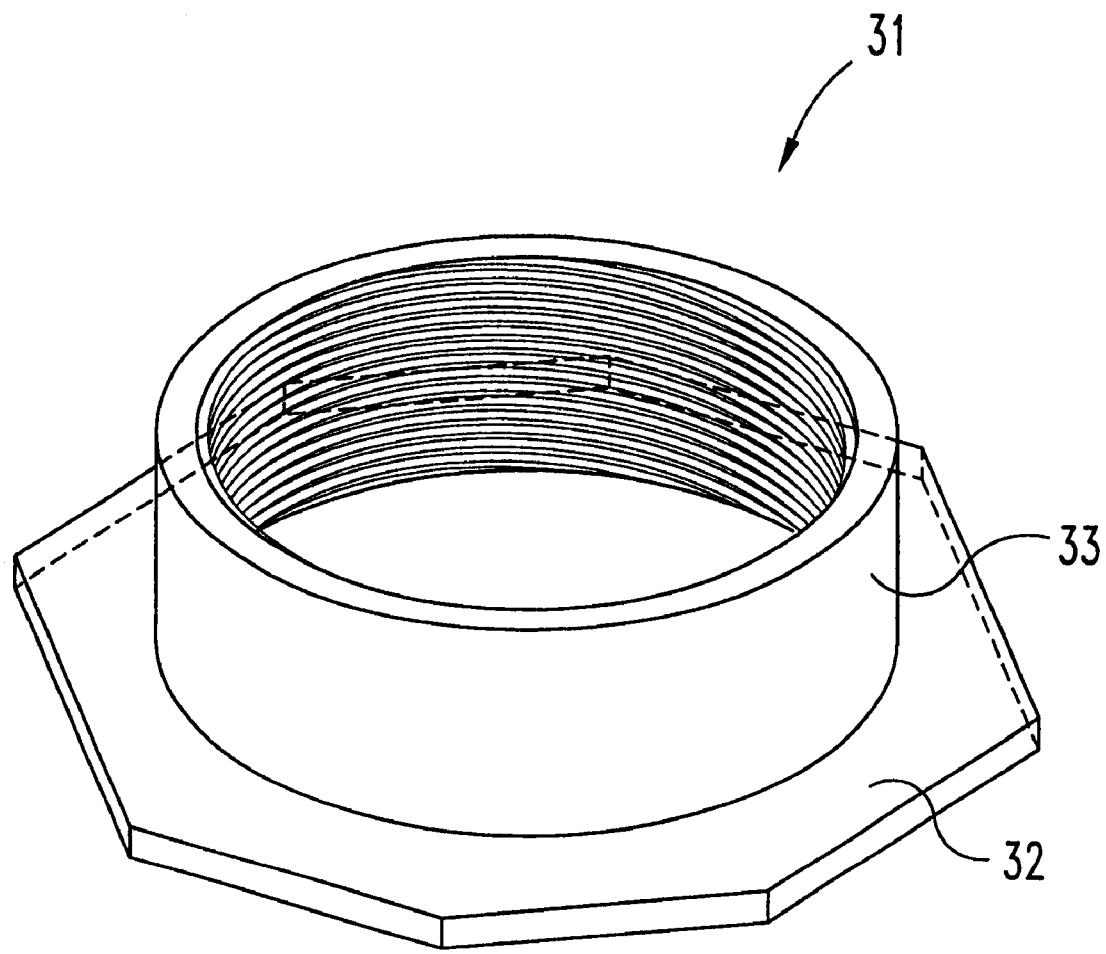
FIG. 4 is a perspective view of a Type I flange as described herein.

Over the years, two flange styles have emerged as standards of the industry though of course other flange styles can be used without departing from the principles of the invention. These two styles have been given the designations of Type I and Type II. Since there are some size and design variations permitted within the more general designations of Type I and Type II, these two types will be described in the context of their basic features. The Type I flange 31 (see FIG. 4) includes an octagonal base 32 and a raised or upwardly extending cylindrical body 33 which is internally threaded in the area generally adjacent to base 32. While as illustrated in FIG. 4 the internal threads extend all the way to the top surface, generally the internal threads on Type I flanges 31 used in the present invention do not. The Type II flange 34 (see FIG. 5) includes a serrated lip 35 and a depending cylindrical body 36 which is internally threaded.

Figure 5:
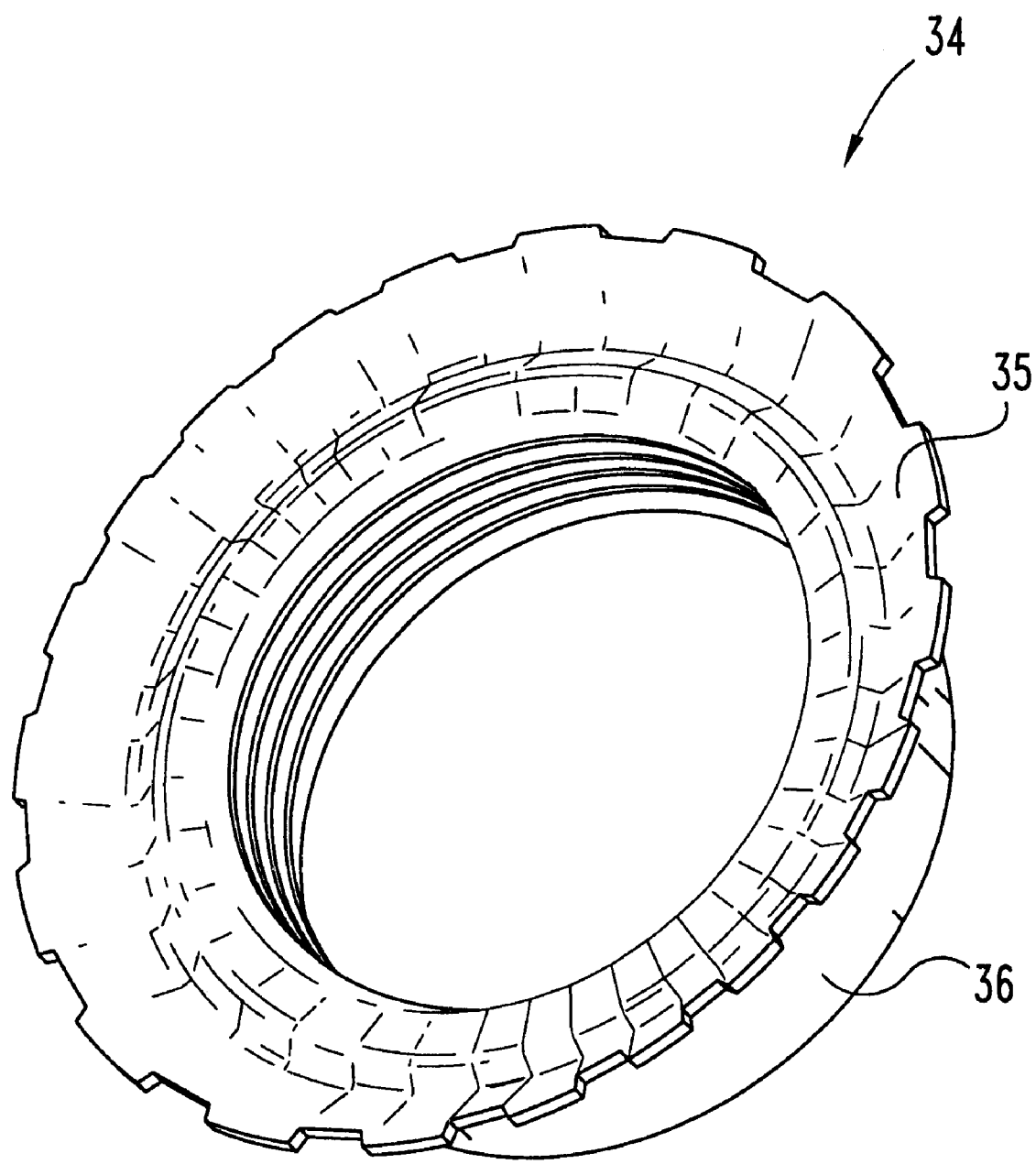
FIG. 5 is a perspective view of a Type II flange as described herein.
Figure 6:
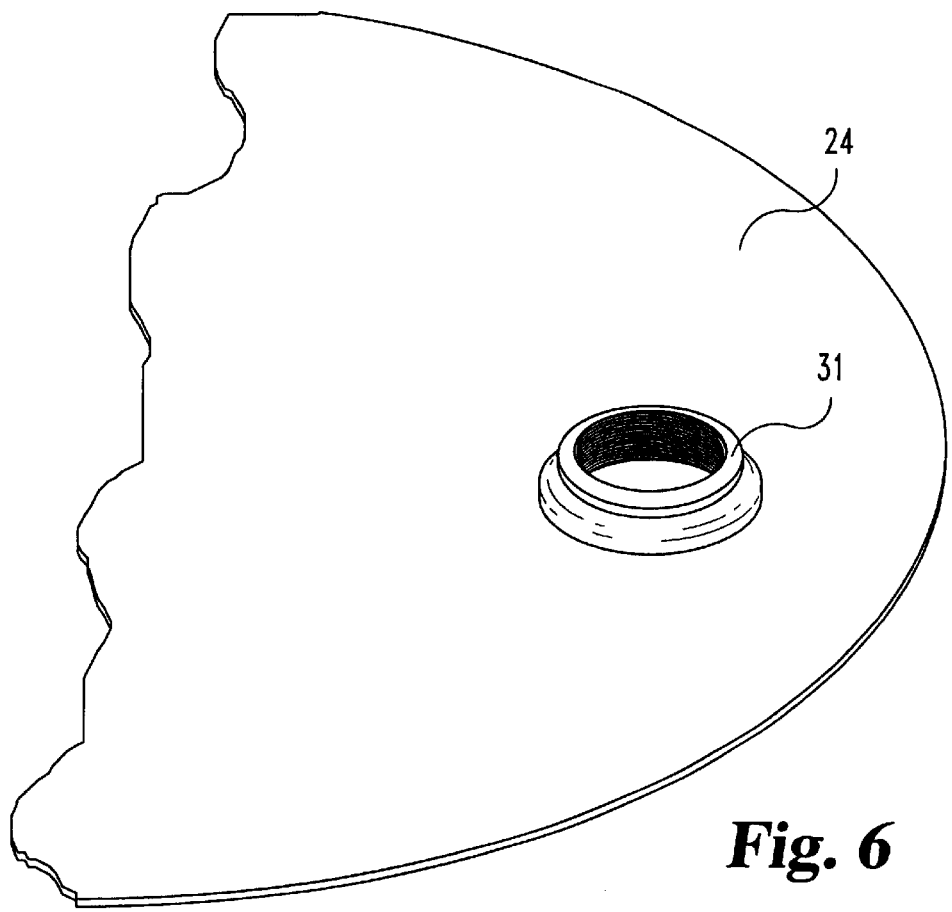
FIG. 6 is a perspective view of the FIG. 4 flange as installed in a drum head.
Figure 7:
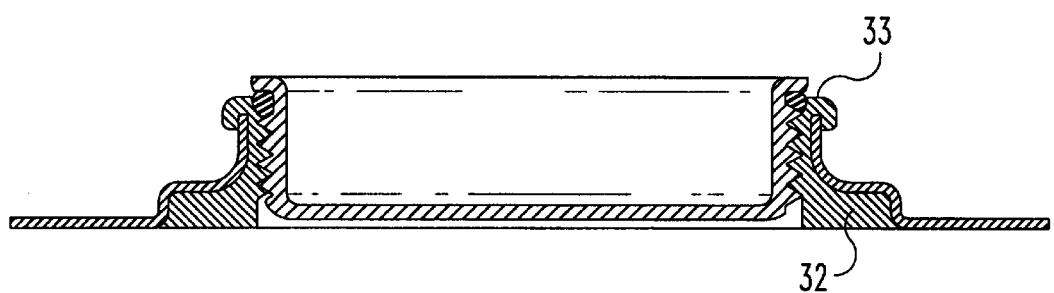
FIG. 7 is a front elevational view in full section of the FIG. 4 flange as installed in a drum head where the flange gasket has been omitted.
Figure 8:
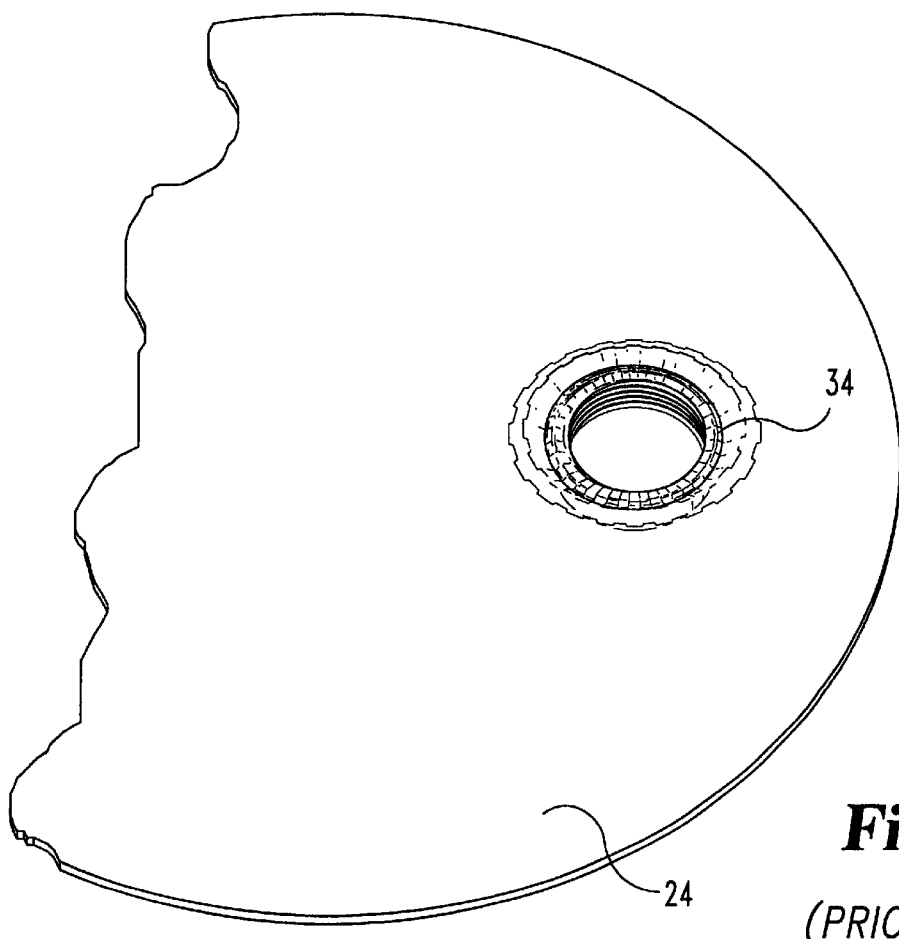
FIG. 8 is a perspective view of a Type II flange as installed in a drum head.
Figure 9:
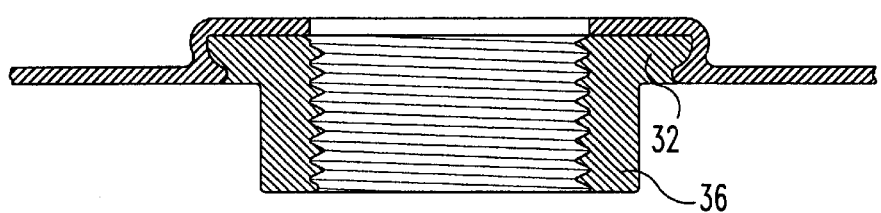
FIG. 9 is a front elevational view in full section of a Type II flange as installed in a drum head.

The FIG. 4 and FIG. 5 illustrations are typical for the corresponding style of flange, whether in the ¾ inch vent size or the 2 inch outlet size. The manner of installing the two sizes of the Type I flange 31 into a drum head are illustrated in FIGS. 6 and 7. The manner of installing the two sizes of the Type II flange 34 into a drum head are illustrated in FIGS. 8 and 9. As will be understood from these illustrations, each flange is securely anchored in position such that the flange is unable to be pushed out, pushed in, or turned relative to the drum head at any level of loading or torque which is within the required DOT upper limits.

In view of the crimping and metal forming steps which are required in order to install the flanges into the drum heads, it will be understood that various dies and tooling are necessary to be able to perform the steps in a reliable and repeatable manner. Associated with these installation steps is the need to pierce the hole and form the corresponding receiving pocket in the drum head. As illustrated, this formed receiving pocket receives the octagonal base 32 in the case of the Type I flange 31 and the serrated lip 35 in the case of the Type II flange. The pocket is formed around the corresponding geometry of the particular flange and locks the base or lip of the flange into the drum head. Since drum heads of the type disclosed herein, with the flanges installed, are in high volume demand by drum manufacturers and/or by the fillers, any manufacturing endeavor for producing drum heads needs to be automated, thus the need for some type of automated flange insertion machine such as the convertible, flange insertion machine 20 according to the present invention as disclosed herein.

It is to be understood that the preparation of the drum head and the insertion (i.e., installation) of the flanges can be performed by what is best described as a one-step operation. The alternative is to follow a two-step operation or procedure. While there are multiple stages in the "one-step" procedure, the idea is that, at a single machine location or station, the drum head is pierced, formed with a receiving pocket, the flange is inserted, and then crimped in place. These four stages occur sequentially without the drum head being moved upstream or downstream to a different location. In the two-step operation, the drum head is prepared with the pierced opening and formed with the desired receiving pocket before being delivered to the flange insertion machine. With the two-step procedure, the drum head is delivered to the insertion station or site of the machine and the selected flanges are similarly brought to that location and, through the appropriate and requisite tooling, the flanges are installed into the receiving pockets and crimped in place in order to secure them against rotation, pull out, or push out. Since the present invention contemplates both methods as well as the insertion of both Type I and Type II flanges, the "convertible" nature of the flange insertion machine, according to the present invention, involves the following possibilities, among other things:

1. A one-step operation for a Type I flange (involving both a ¾ inch vent flange and a 2 inch outlet flange).
2. A one-step operation for a Type II flange (involving both a ¾ inch vent flange and a 2 inch outlet flange).
3. A two-step operation for a Type I flange (involving both a ¾ inch vent flange and a 2 inch outlet flange).
4. A two-step procedure for a Type II flange (involving both a ¾ inch vent flange and a 2 inch outlet flange). For each of these four possible machine configurations, there is one set of tooling on one side of the machine for the ¾ inch vent flange and another set of tooling on the other or opposite side of the flange insertion machine for the 2 inch outlet flange.

Due to the differences in the flange styles, the corresponding differences in the drum head and the differences in the dies and associated tooling, a single insertion machine with a fixed configuration is not capable of handling both Type I and Type II flanges. If a manufacturer wants to handle both flange styles (Type I and Type II), then two machines are required, at least that was the situation before the present invention. What the present invention provides is a way to convert a Type I insertion machine into a Type II insertion machine and then back to a Type I insertion machine or vice versa. The method and structure of the present invention precludes the need for a second machine and this represents a substantial monetary savings. While the conversion steps require some additional labor, the amount of time required is minimal due to the structural features and relationships which are included as part of the present invention. This conversion is applicable for the Type I and Type II flanges whether using the one-step procedure or the two-step procedure.

Figure 10:
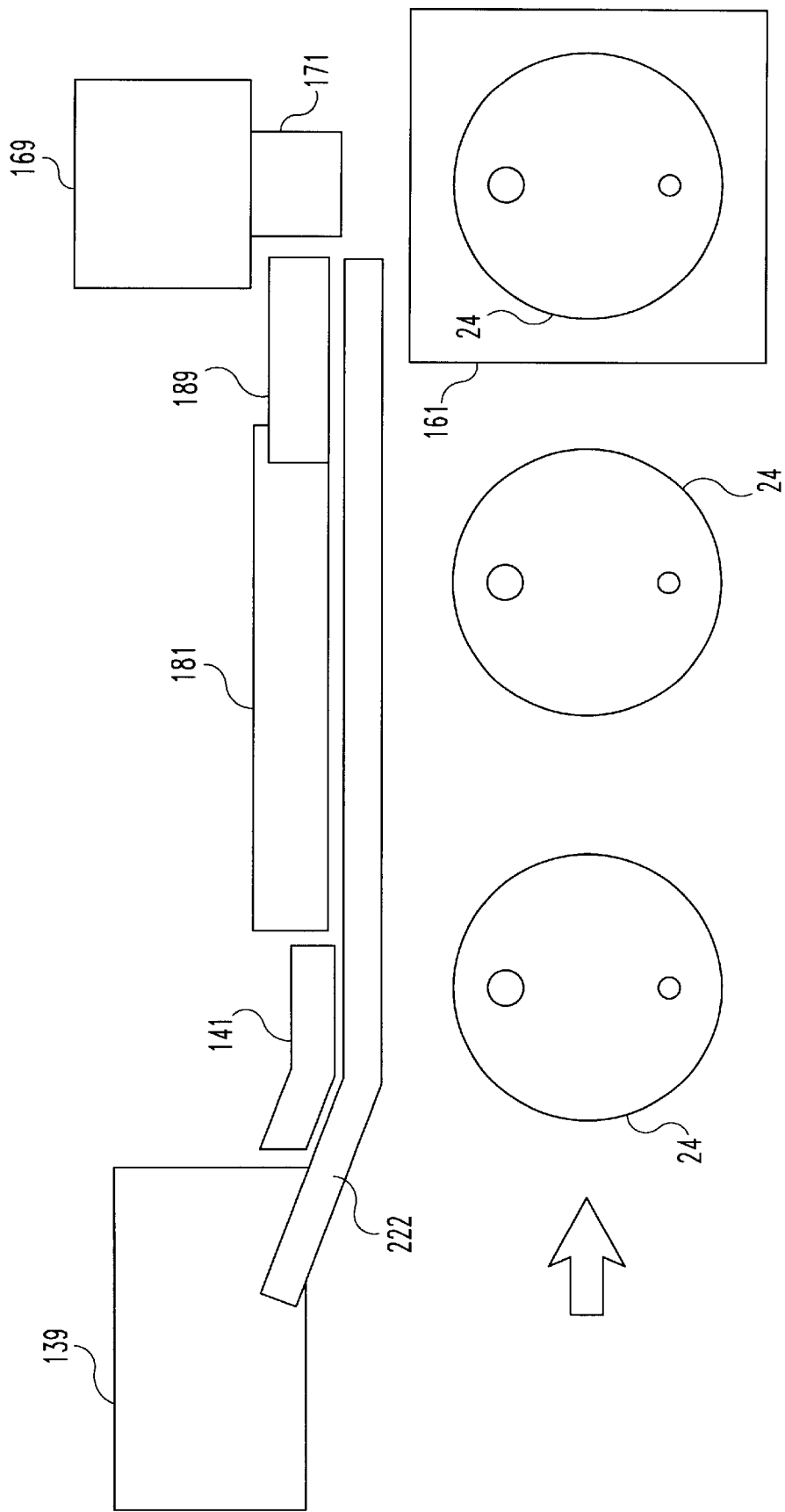
FIG. 10 is a block diagram of the functional stages associated with the FIG. 1 convertible, flange insertion machine.

With continued reference to FIGS. 1 and 2 and with reference to the block diagram of FIG. 10, the primary functional stages and steps associated with flange insertion machine 20 are illustrated. It will be assumed that flange insertion machine 20 is initially configured for a set of Type II flanges and that the resulting drum head 24 includes the Type II flange style. It will also be assumed that machine 20 is going to handle drum heads based on the two-step procedure.

Referring first to FIG. 10, drum heads 24 are conveyed generally in the direction of arrow towards a flange insertion assembly 161. Flange track 222 runs alongside the drum heads to convey flanges also generally along the direction of arrow from a flange feeder assembly 139 to a flange loader assembly 169. The flange loader assembly 169 includes a loading apparatus 171 for placing the flanges into the insertion assembly 161 where the flanges are installed into the drum heads 24. Along the length of the flange track 222 there are provided several non-mutually exclusive stages or characteristics of the flange track 222 including a vertical retainer portion 141, a guide rail portion 181, and an indexing portion 189.

Turning more particularly to FIGS. 1 and 2 and under the assumptions discussed above, the insertion procedure begins with the stocking of the conveyor lines with a supply of the ¾ inch vent flanges of the Type II style, a supply of the 2 inch outlet flanges of the Type II style, and a supply of drum heads. The metal drum heads have been prepared with the pierced holes and the formed pockets for receipt of the two sizes of the Type II flanges. Conveyor line 21 carries the ¾ inch vent flanges 27 to the corresponding downstream insertion station and conveyor line 22 carries the 2 inch outlet flanges 28 to the corresponding downstream insertion station. Conveyor line 23 handles the drum heads.

In the FIGS. 1 and 2 illustrations of machine 20, the ¾ inch vent flange 27 is a Type II style of flange as is the 2 inch outlet flange 28. A generally cylindrical spiral track hopper 39 sequences the supply of flanges 27 into a continuous track which spirals on the interior and exits out one side by means of exit track 39a which connects to and feeds flanges into the start of conveyor line 21. The flanges 27, 28 can be oriented in the continuous spiral track with the serrated lip 35 on top or on the bottom. However, the feeding of the flanges to the location where they are inserted into the drum head 24 requires that the flanges be oriented with the serrated lip 35 disposed on top and that the flanges be oriented in this fashion. In this orientation, the body 36 depends downwardly from the serrated lip 35 toward conveyor 21. In order to properly orient the flanges 27 and 28, the spiral track hopper, one associated with each size of flange, includes a guide that only allows the flange to pass if properly oriented and ejects the flange if it is inverted such that the serrated lip is on the bottom.

The second, generally cylindrical spiral track hopper 40, which is used on the opposite side of machine 20 for the supply of Type II 2 inch outlet flanges 28, has a design which is virtually identical to hopper 39, though modified so as to accommodate the different sizes of flanges which are loaded in those hoppers for arranging and sequencing into the corresponding conveyor lines 21 and 22. The design of hoppers 39 and 40 is virtually identical except for the sizes of flanges which are handled and the corresponding sizing of the tracks and ejection mechanisms, including exit track 40a which must be wider than exit track 39a.

Both exit track 39a and 40a preferably include rails 41 and 42 for vertically restraining flanges as they travel down the respective exit tracks. Rails 41, 42 are generally positioned roughly over the centerline of the track and a suitable distance above the flange height so as not to impede flange travel but to prevent flange ejection from the track. Depending on the type and height of the flange being used, the restraining rails are preferably adjustable at least ¹⁄₁₆ inch and preferably up to 1 inch in either direction to accommodate the variation in flange height between the Type I and Type II flanges.

The "continuous" supply of flanges 27 and 28 are guided to the downstream insertion sites (one for each size of flange) in the insertion machine 20 where they are installed into the drum heads 24 which travel to a location that corresponds to the two insertion sites, by means of conveyor line 23. As can be appreciated, the drum heads 24 travel in the same direction as flanges 27 and 28 along conveyor line 23 which is generally centered between conveyor lines 21 and 22. At the insertion sites, upper and lower dies are used to insert and secure the ¾ inch vent flange 27 and the 2 inch outlet flange 28 into the same drum head 24. The pierced and formed openings in head 24 which are used to receive the flanges 27 and 28 (one each) are located approximately 180 degrees apart, corresponding to conveyor lines 21 and 22, which are, for convenience and economy of configuration, parallel to each other and located on opposite sides of conveyor line 23 which carries the drum heads.

Since the illustrated embodiment of FIG. 1 is designed for Type II flanges and a two-step procedure, the drum heads 24 have already had the first step performed before arriving at machine 20. This first step involves having the metal of the drum head 24 pierced and formed on one side for the ¾ inch vent flange 27 and pierced and formed on the opposite side (180 degrees apart) for the 2 inch outlet flange 28. The "prepared" drum heads are supplied to machine 20 and manually loaded onto the starting end of conveyor 23.

Figure 11:
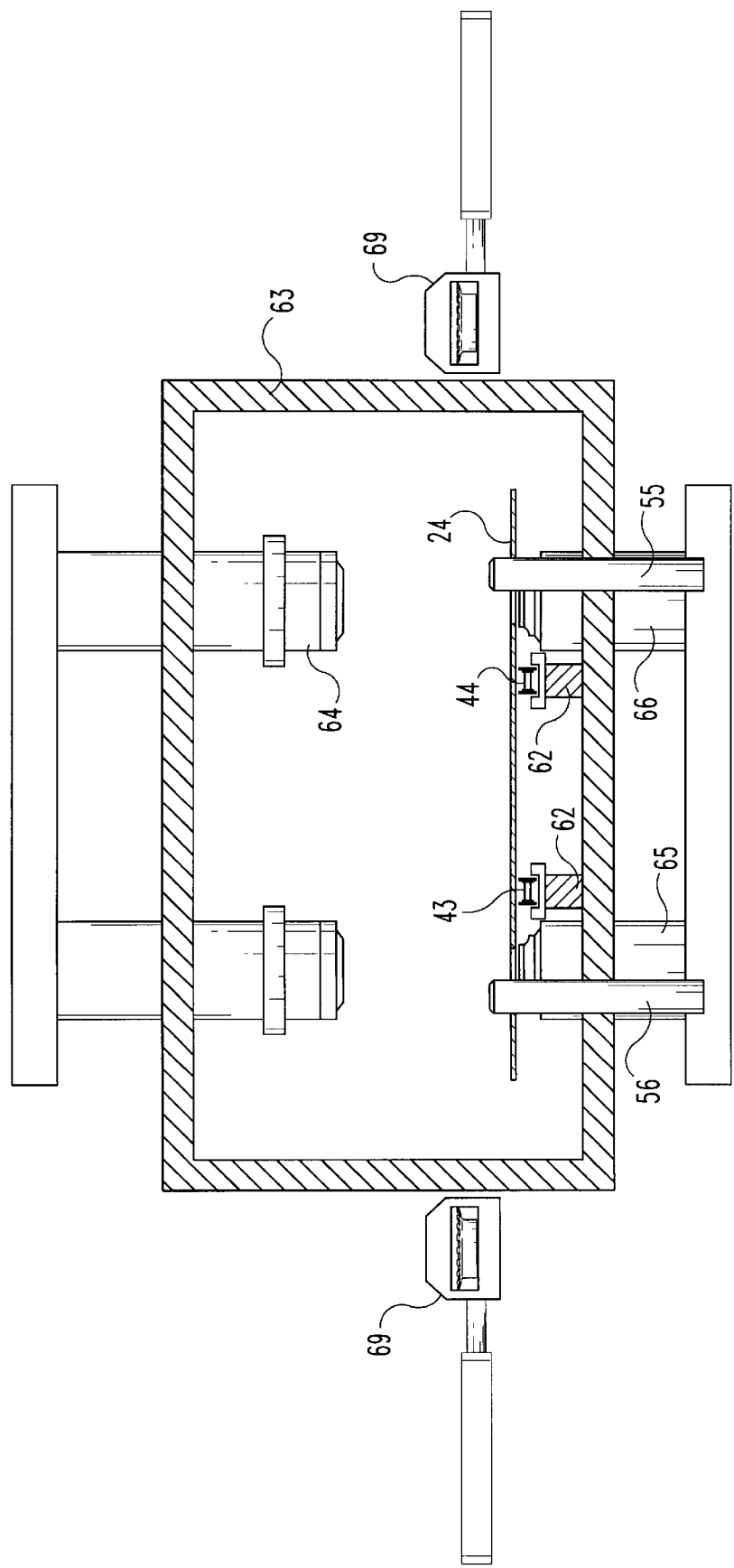
FIG. 11 is a diagrammatic, front elevational view of the rear or trailing end of the FIG. 1 convertible, flange insertion machine.
Figure 12:
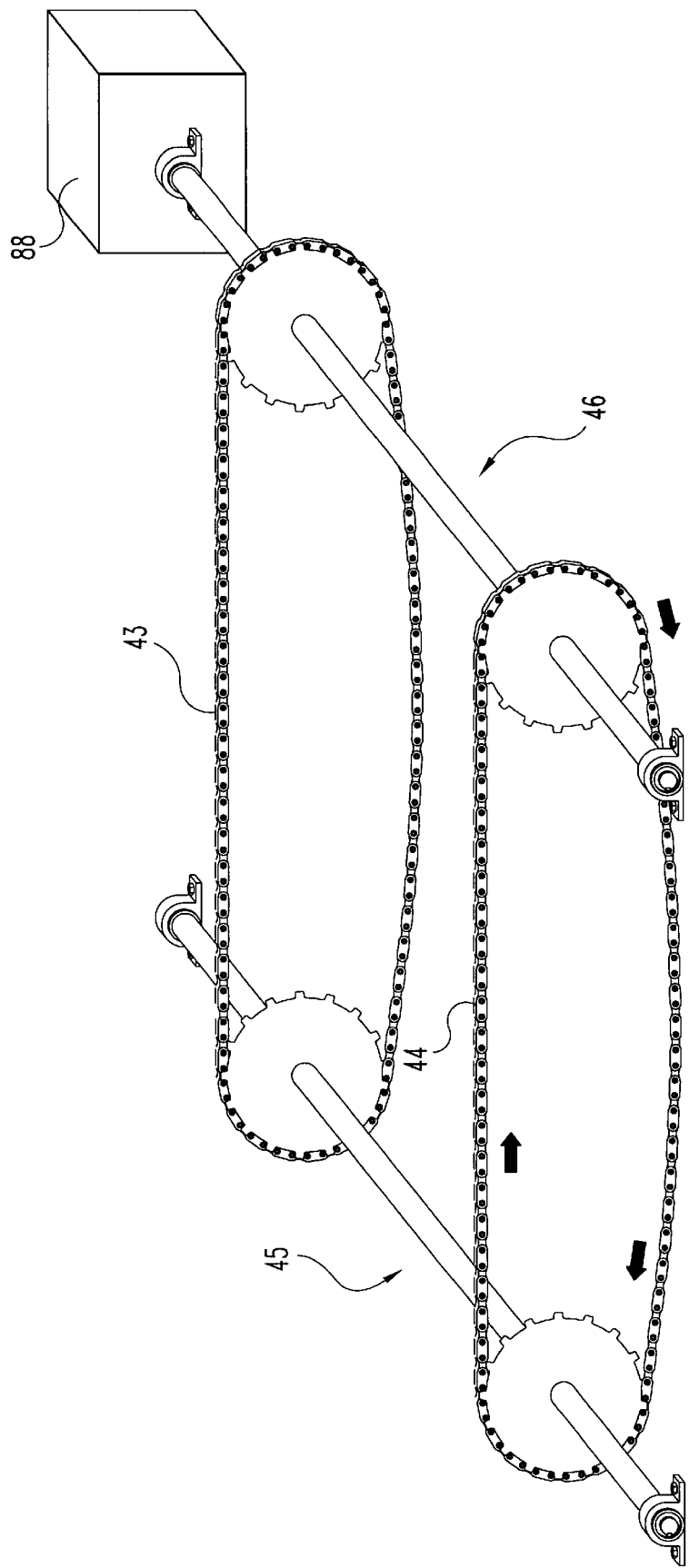
FIG. 12 is a diagrammatic illustration of a roller chain and sprocket assembly for a drum head conveyor which comprises one component part of a machine according to an embodiment of the present invention.

Conveyor 23 is designed with two endless loop lengths of roller chain 43 and 44 (see FIGS. 2 and 11) and are extended around cooperating sets of drive sprockets 45 and 46 which are supported at each end and which driven by motor 88. FIG. 12 is a diagrammatic illustration of this chain and sprocket arrangement including the drive motor arrangement. Conveyor 23 is in constant or continuous drive motion such that even when the drum head 24 might be stopped (temporarily), the conveyor chain lengths 43 and 44 continue to move in unison beneath the drum heads which are loaded onto conveyor 23.

For most applications, the drum head 24 is manually positioned at the start of the center conveyor 23 by centering the two head openings (vent and outlet) on two cones 49 and 50 which are in a raised or elevated position. The cones are raised and lowered by a lift motor (not illustrated). An electromagnetic proximity sensor determines when a drum head 24 is present, having been manually loaded on the two cones 49 and 50. This proximity sensor then sends a signal to the lift motor that controls the raising and lowering of the cones in order to lower the two cones. There is a cone on each side of the center conveyor 23 so that one cone is placed into the 2 inch outlet hole of the drum head 24 and one is placed into the ¾ inch vent hole. Once these front two cones are lowered, the drum head is moved forward in the direction of the insertion location. As previously noted, the drum head conveyor 23 is continuously driven, so as soon as the two cones 49 and 50 come out of engagement with the drum head, there is nothing to keep the drum head from moving "downstream". A pair of cylindrical abutment posts 51 and 52 are used to stop movement of the drum head 24 and another proximity sensor (not illustrated) sends a signal to raise two additional cones 53 and 54 for final alignment of the drum head. These cones 53 and 54 are raised and lowered by a lift motor (not illustrated) and are aligned with the two openings in the drum head. If either cone does not align with the corresponding opening, the cone will not extend to its full raised height as controlled by the lift motor, and this sends a warning signal that there is an alignment problem with regard to the drum head 24. Assuming that the cones are able to be fully extended into their raised position, they are then reset and lowered so as to be pulled out of engagement with the drum head 24. At this point, this drum head 24, which is in line and waiting for flange insertion, cannot move into the flange insertion station until the drum head 24*b*, which is presently in that location, moves out. There is a second pair of cylindrical abutment posts 55 and 56 which are downstream from the tooling and dies for the flange insertion which prevent the drum head at the insertion station from moving forward. Once the flange insertion is completed, these rear or downstream abutment posts 55 and 56 are lowered, and since the center conveyor 23 is continuously moving, the completed drum head, with flanges installed, exits the machine. As the rear abutment posts 55 and 56 are lowered so that the finished drum head 24*b* can move out of the way, the front abutment posts 51 and 52 are simultaneously lowered so the next drum head 24 in line can move into position at the insertion station. As soon as the finished drum head clears the rear abutment posts, those posts are once again raised so as to stop the next drum head as it moves forward. As these abutment posts come up to stop the next drum head in position, the front abutment posts also move back up to their raised position so as to stop the next drum head in line.

The conveyor 23 is divided into three sections 58, 59, 60. The section 60 of the center conveyor 23 which leads into and through the insertion station 61 of machine 20 is supported by a framework 62 which is connected with depending support rods 63 to the upper die head 64 as illustrated in FIG. 11. As this upper die head 64 moves down as part of the flange insertion procedure, this section 60 of the conveyor 23 is lowered and this allows the drum head 24, positioned on that portion of the conveyor 23, to come to rest on the two lower die halves 65 and 66. There is a lower die half 65 on one side of the machine for the ¾ inch vent flange and a separate lower die half 66 on the other side of the machine for the 2 inch flange. Although there is alignment of the drum head 24 when it travels from the second set of alignment cones 53 and 54 to the insertion station 61, there is also a small bit of self-alignment as the two openings in the drum head center themselves on the lower die halves 65 and 66.

In order for the two sizes of flanges to be installed, an additional mechanism 69 is required on each side of the insertion machine 20, one for the 2 inch flange and one for the ¾ inch flange to move the flanges from their feeder tracks to the appropriate die half. These mechanisms 69 or feeder nose assemblies (see FIGS. 13 and 13A) involve a tooling block 70 which has a securing or clamping member in a lower receiving pocket 71 into which the corresponding flange is pressed. Upon receiving a flange into the holding or receiving pocket 71, fluid powered cylinder 72, or other tooling block driver, pushes the flange receiving pocket 71 inwardly from the side in a direction substantially perpendicular to the direction of travel of the center conveyor 23 and to the direction of travel of the two conveyors 21 and 22 for the corresponding flanges. The pocket 71 positions and releases the flange to deposit the flange on the lower tooling die for insertion into the lid.

Figure 13:
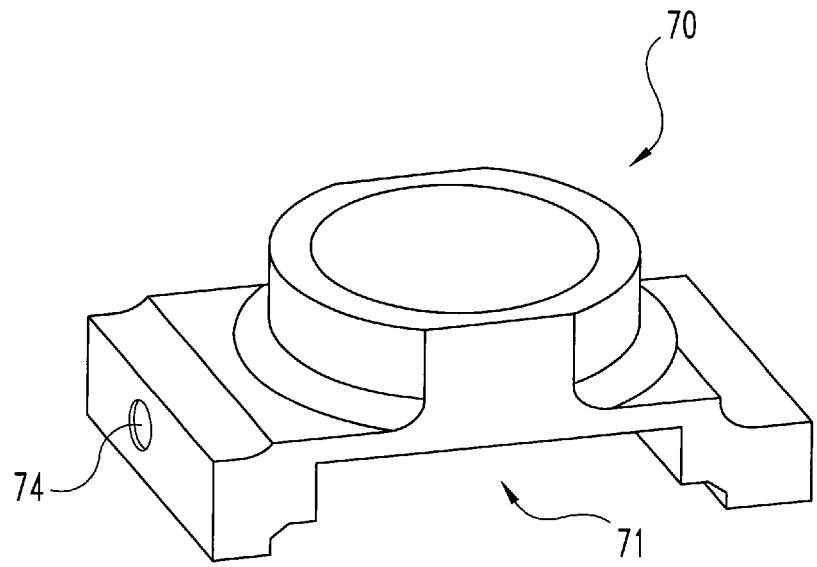
FIG. 13 is a perspective view of a tooling block for a Type I flange insertion mechanism which comprises one component part of a machine according to an embodiment of the present invention.
Figure 13A:
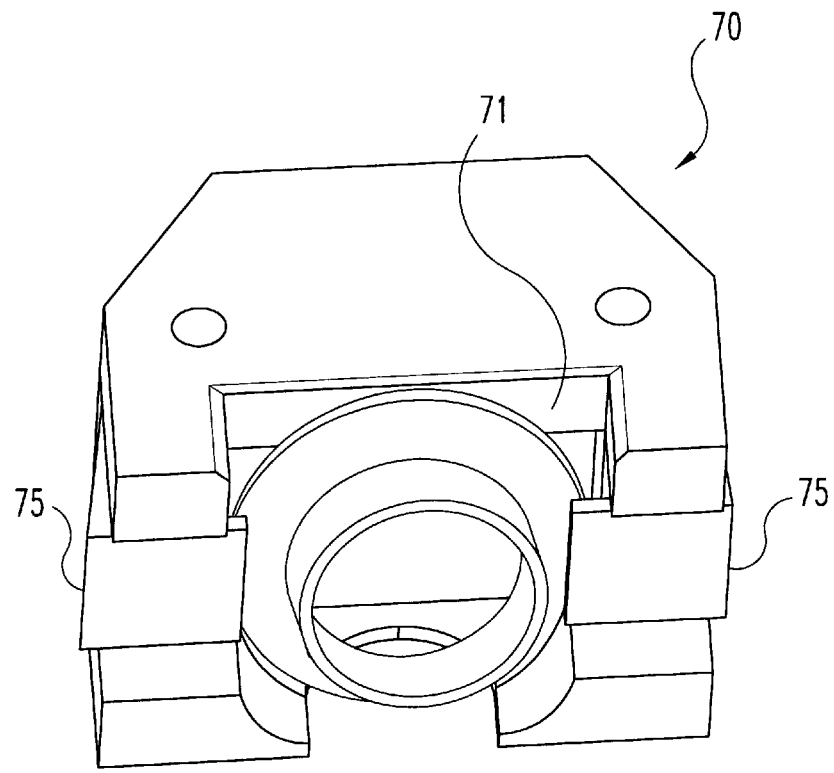
FIG. 13A is a perspective view of a tooling block of a Type II flange inserting mechanism which comprises one component part of a machine according to an embodiment of the present invention.

In operation, the vent and outlet flanges are conveyor fed in their corresponding track into the general vicinity of the tooling block 70. Then, at the correctly timed moment, the indexer 89 pushes on the outer edge of the flange so as to insert it into the receiving pocket 71 in the tooling block 70. The securing member located in that receiving pocket secures the flange in place. The securing member can include a ball detent, a clamp, or any other gripping member to engage the cylindrical body and/or the lip of the flange for releasably holding the flange. In particular, when running Type II flanges, the securing member includes a pair of oppositely disposed arms 75 biased to grip the flared portion of a Type II flange as depicted in FIG. 13A. When running a second flange style, the securing member includes a pair of oppositely disposed ball detents 74, which could include vlier pins or other projections biased for friction engagement with the outer cylindrical body of a Type I flange as depicted in FIG. 13. In each instance, the securing member is spring biased to grip or hold the flange, and the flange is inserted into the pocket 71 by the indexer 89 which applies a force sufficient to overcome the biasing force of the securing member. In the illustrated embodiment, gripping members 74 and 75 additionally provide a measure of self centering as the flange in pressed into its corresponding receiving pocket 71. This provides the additional advantage of correcting or compensating for slight variations in the force with which a particular flange or flange style is pressed into the pocket 71.

Of course, the feeder nose assembly, including the tooling block and securing member, could also be configured to positively open and grip the flange or to releasable grip the flange by any means known in the art. Similarly, a tooling block such as a pick and place may also be used to move the flange from the flange track to the appropriate die.

Figure 29:
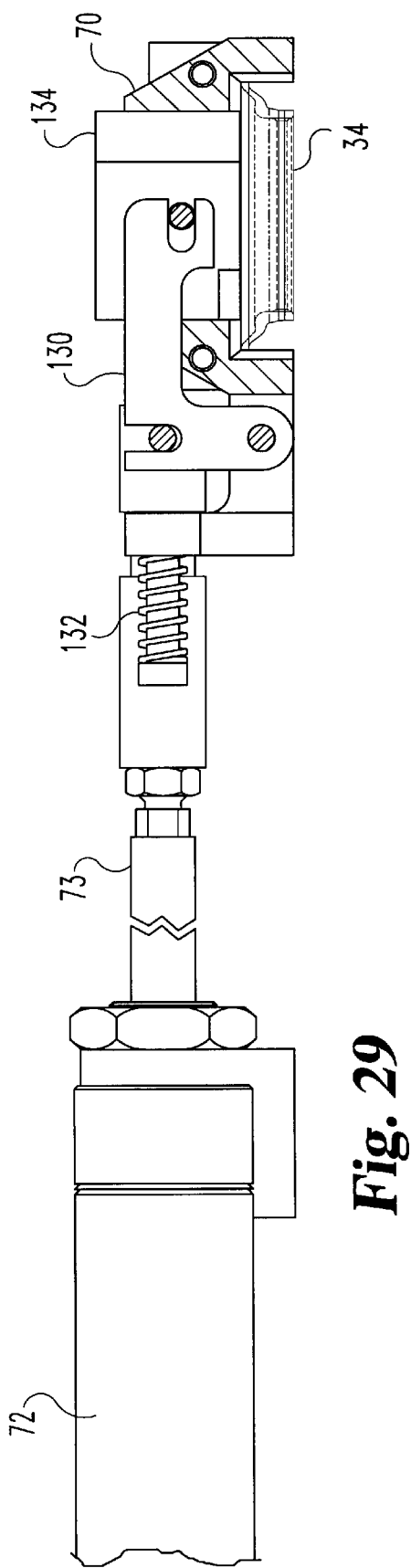
FIG. 29 is a side elevational view in partial section of the flange release assembly of the flange inserting mechanism prior to release of a flange.
Figure 30:
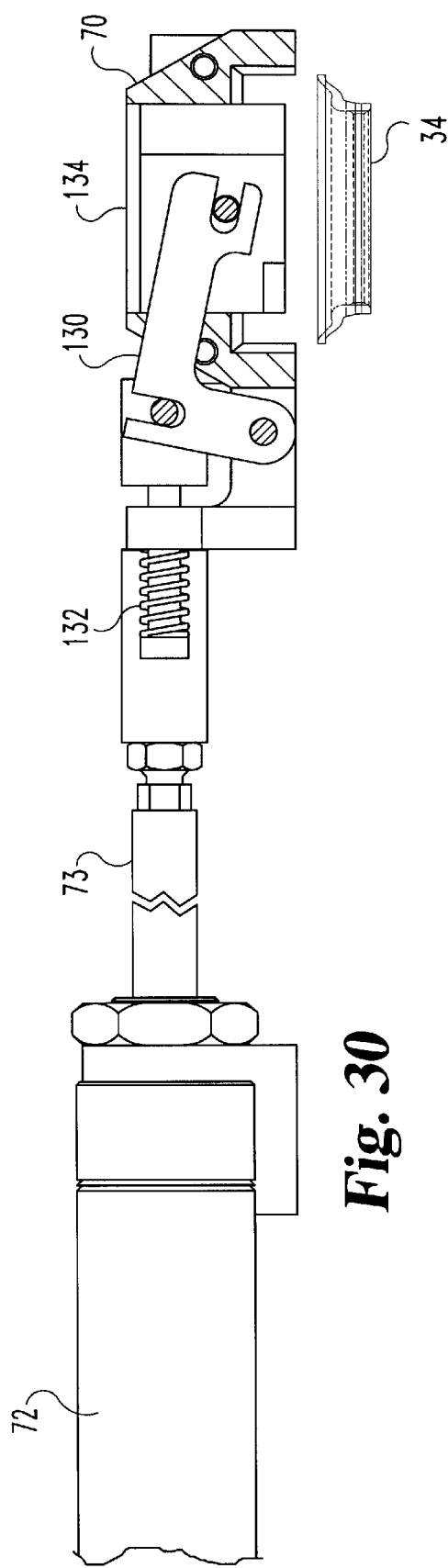
FIG. 30 is a side elevational view in partial section of the flange release assembly of the flange inserting mechanism after release of a flange.

In the illustrated embodiment, movement of the cylinder arm 73 advances the tooling block and flange into position over the corresponding opening in the drum head where a positive stop, provided by guide rods (not shown) parallel to cylinder arm 73, operates to center the receiving pocket 71 and the flange over the corresponding lower die half 65 or 66. As shown in FIGS. 29 and 30, after encountering the positive stop the cylinder arm 73 still has an additional stroke of approximately ½ inch. The cylinder arm 73 is coupled to and operates a flange release assembly mounted on the tooling block 70. The flange release assembly includes an internal linkage within the tooling block 70 that acts to push the corresponding flange down to release the flange into the lower die half by continued movement of cylinder arm 73. The internal linkage includes a knuckle or pivoted lever 130 coupled to the end of the cylinder arm 73 that operates a cylindrical piston 134 disposed over the flange in the receiving pocket 71. The piston has a downward stroke that contacts the flange to apply a downward force on the flange to overcome the holding force of the securing member and release the flange from the receiving pocket 71. Upon retraction of the cylinder arm 73, spring 132 acts to raise the cylinder 134 to configure the pocket 71 for receiving the next flange in sequence. What is occurring on one side of the insertion machine 20 with regard to one flange (either vent or outlet) is occurring at the same time in a similar fashion on the other side of the insertion machine for the other size flange While in the illustrated embodiment the particular dimensions and configuration of the tooling block 70 and gripping member changes depending on the particular flange style being run, each block 70 will operate as described above. Consequently, the cylinder, or tooling block driver, which couples to the linkage arrangement can operate either style tooling block and need not be changed when converting between running different flange styles. In addition, while it may be more convenient to provide the flange release assembly as a part of the tooling block 70 for removal and mounting to the cylinder arm 73 during conversion, in the illustrated embodiment the tooling blocks 70 are each operable by identical flange release assemblies. In the preferred embodiment, the tooling block 70 and piston 134 are provided customized for each particular flange style with preferably only the height of the cylinder 134 varying for Type I and Type II flanges. The customized tooling block 70 and piston 134 is then mounted to the flange release assembly for operation thereby further reducing the amount of changes upon machine conversion. Alternatively, flange release assemblies can be customized for any particular flange style with solely the interface with the cylinder arm 73 being uniform.

Once the tooling and die procedure with regard to flange installation is completed, the upper half of the die tooling 64 is raised and this in turn raises the supporting frame structure 62 and accordingly raises the conveyor section 60. As this occurs, the completed drum head 24 is lifted or raised off of the lower die halves 65 and 66 and, since the center conveyor 23 is continuously turning, the completed drum head is automatically exited from the insertion machine 20.

Figure 14:
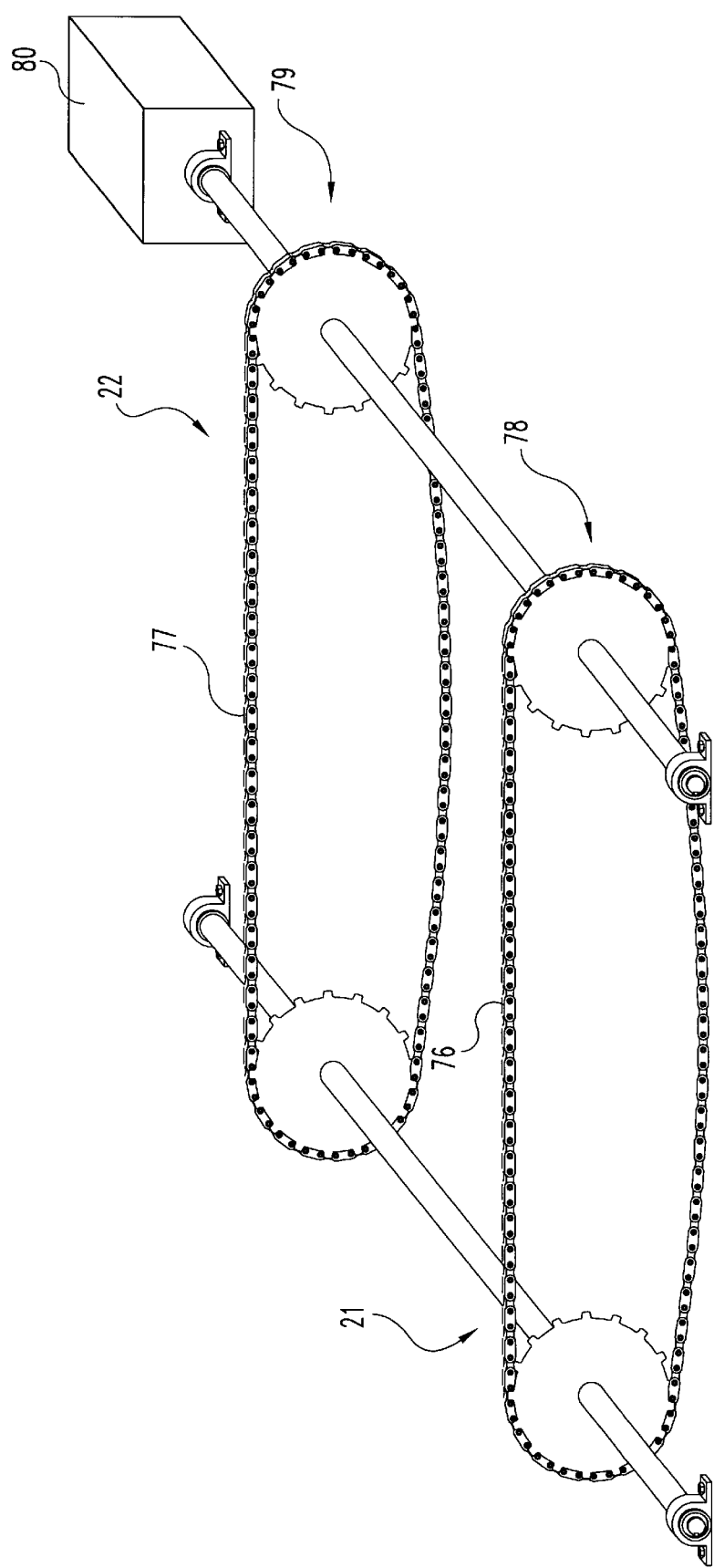
FIG. 14 is a diagrammatic illustration of two chain and sprocket arrangements for a pair of flange conveyors.

With reference to FIG. 14, each flange conveyor 21 and 22 includes a corresponding length of roller chain 76 and 77 connected into an endless loop and extended around a cooperating pair of sprockets 78 and 79 respectively. One pair of sprockets is associated with each conveyor and with each length of roller chain. In addition, there are parallel supporting surfaces 82 running the length of the flange conveyors on either side of the roller chain 76 and 77, for providing additional support for the flanges. In one embodiment of the present invention there is a motor drive for each conveyor, but the two motor drives are synchronized with each other. In another embodiment of the present invention, a single motor drive 80 (see FIG. 14) is used and commonly linked so that both conveyors are driven in a synchronous manner by the same drive motor.

Figure 15:
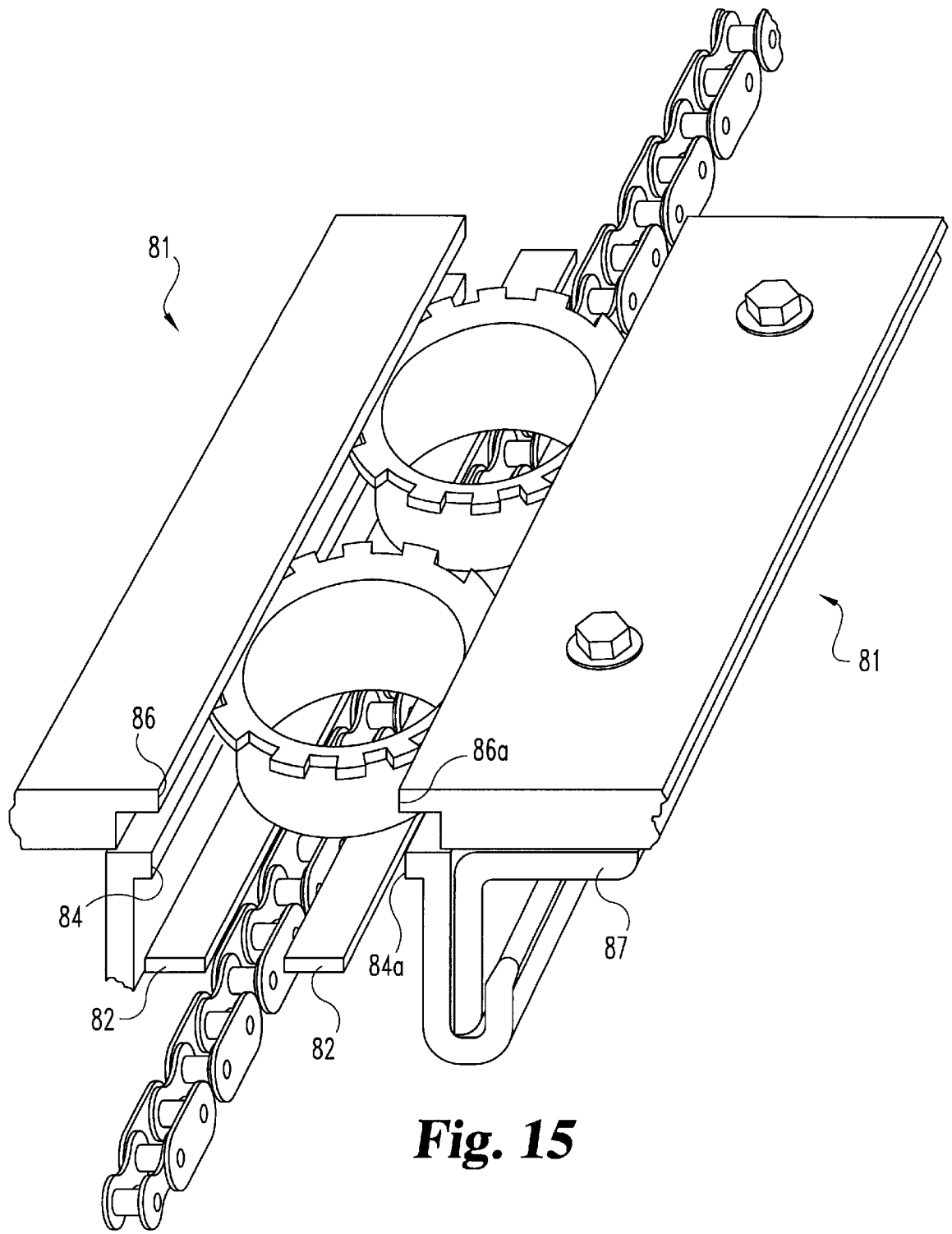
FIG. 15 is a partial, perspective view of a pair of side rails and one flange conveyor cooperating with a single flange type according to one embodiment of the present invention.
Figure 16:
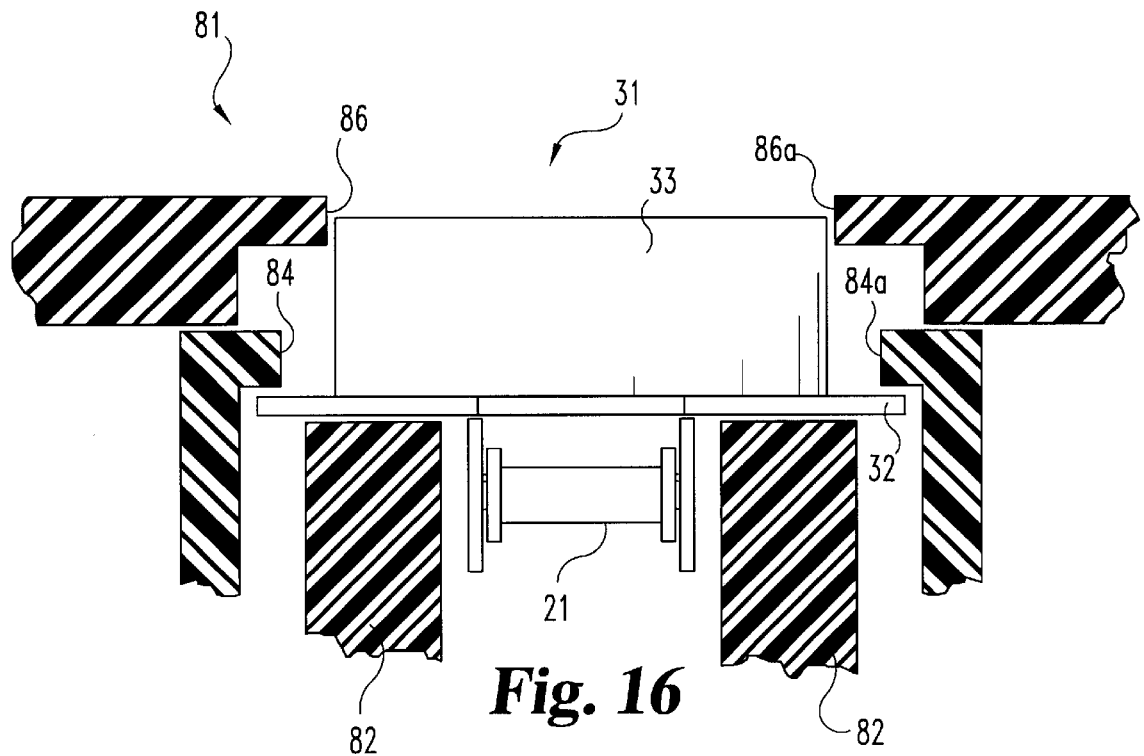
FIG. 16 is a front elevational view in full section of a pair of side rails in cooperation with a Type I flange.
Figure 17:
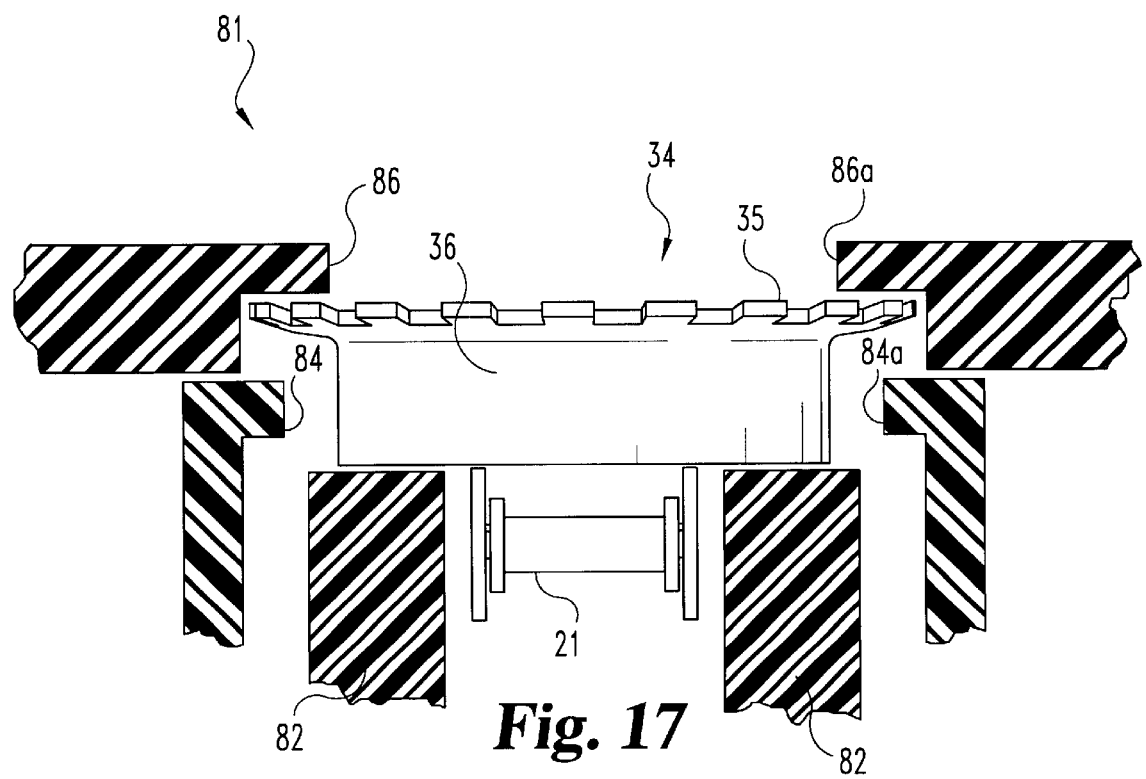
FIG. 17 is a front elevational view in full section of a pair of side rails in cooperation with a Type II flange.

While the flanges 27 and 28 actually ride up on top of the corresponding conveyors 21 and 22 between the flange supporting surfaces 82, included as part of the present invention are synthetic material side rails 81 (see FIGS. 15, 16, and 17). In one embodiment the side rails are configured to actually hold and guide the flanges and control their travel through insertion machine 20. FIGS. 15, 16, and 17 illustrate the side rails for the 2 inch outlet flange and how they are configured to hold and guide both Type I and Type II flange styles. The side rail design for the ¾ inch vent flange is virtually identical to the side rail design for the 2 inch outlet flange, except for the sizing (scaling up or down) due to the size differences of the two flanges.

A noted, one important feature of the present invention is the fact that the synthetic material guiding side rails 81 are configured so that they can accommodate the Type II flange style (serrated) when those parts are being run and the Type I flange style (octagon base) when those parts are being run, without the need to change the side rails. While the convertible aspects of the present invention do involve changing some of the tooling, for the most part these changes are fairly easy to accommodate and do not necessitate a great deal of time nor difficulty. However, changing out of the side rails would constitute a substantial time investment.

The cross sectional shape of the side rails 81, as illustrated in FIGS. 15, 16, and 17, include a lower lip 84 which actually receives the octagonal base 32 for the Type I style of flange. When the serrated style of flange (Type ID) is being run, the same side rail 81 has an upper lip portion 86 which is placed on top of the outer edge of the serrated lip in order to hold the flange in position. The distance of separation between the two side rail upper lip portions 86 and 86a on opposite sides of the flange are somewhere less than 1 inch, preferably approximately ½ inch, and more preferably between ¹/₁₆ and ¼ of an inch, wider than the outer diameter of the cylindrical body portion 33 of the octagonal flange (Type I). Consequently, when the octagonal flange is run, which is a slightly taller flange, this upper cylindrical body portion 33 travels between these two side rail lip portions 86 and 86a. By extending farther towards the conveyor centerline than do the lower lip portions 84 and 84a, lip portions 86 and 86a guide a larger relative portion of the serrated lip of a Type II flange than do lips 84 and 84a for the octagonal base of a Type I flange. In addition, portions 86 and 86a serve the additional purpose of guiding the upper cylindrical body 33 of the Type I flange as that flange is advanced in the conveyor. In one embodiment, the upper lip extends ¾ inch more, preferable at least ⅟₁₆ inch more, and most preferably approximately ⅓–⅙ inch more towards the centerline than does the lower lip 84.

These side rails are created in individual longitudinal sections which can either be extruded or machined. Preferably, the side rails are positioned to have at least a portion of a side rail in restraining relation to the flanges during the entire length of travel of the flanges, or at least during the entire length of the flange conveyors 21 and 22. It is also envisioned that at least each lip portion of the entire side rail, from start to finish, as well as the supporting surfaces 82, would be a single extrusion or machined piece of material such as wood, metal, or a polymeric material such as polyhigh. However, cost considerations may not make this the preferred approach, and for example, a single side rail can be constructed by connecting individual portions of side rails end to end along the length of the conveyors 21 and 22. In such an elongated sectional configuration, adapters or connectors of flexible material such as rubber of plastic can be provided to eliminate the gaps and smooth the transition between side rail sections to avoid catching the flanges or otherwise impeding their travel along conveyors.

While it is envisioned that the entirety of a single side rail or section of side rail can be, as viewed in cross section, a single extruded and/or milled piece, it may be desirable to manufacture the side rail in several sections. For example, a portion including lip 84 may be provided separate from the member providing lip 86. When formed of several pieces, the separate members could be mounted together and/or mounted to portions of the machine, such as the conveyors 21 and 22.

In one embodiment, the side rail is provided in two elongated sections each secured to a mounting member 87. The mounting member 87 is placed adjacent the conveyors 21 and 22 to provide the guide rail to guide the flanges, and member 87 may itself be pivotally attached to a portion of the conveyor body to allow easy access and adjustment.

The gap designed to guide the upper lip of, for example, the Type II flange, bounded by side rail portions 86 and 84, is preferably sized to accommodate the entire vertical height of the flared portion of Type II flange. In one embodiment, the gap is wide enough to permit some degree of piggy backing of Type II flanges while providing adequate guiding of the Type II flanges to avoid machine jams and handling errors. For example, the gap, as well as the gap for guiding the Type I flange, can be adjusted to allow overlap solely between flared portions of flanges. In another embodiment, the gap is adjusted such that a portion of the flared portion 35 is allowed to ride up on an adjacent flange without the flared portion 35 of one flange 34 contacting the cylindrical body portion 36 of an adjacent flange 35 during normal operating conditions and flange conveyor speed 21 or 22. In another embodiment, the gap is between ⅓ and ½ inch, preferable approximately ¼ inch for the ¾ inch flange side rails, and between ½ and ¾ inch, preferably approximately ⅓ inch for the 2 inch flanges.

The conveyors 21 and 22 which are used for each of the flange tracks and positioned beneath and between the corresponding pair of side rails 81 actually end at about the location of the cylindrical abutment posts 55 and 56. Positioned above each flange track is an indexer 89 including a pneumatic cylindrical/linkage arrangement (see FIGS. 18–23) which is designed to sequentially push the flanges for insertion into the mechanism 69, to be moved into position over the drum head and lower die for insertion into the receiving portion of the drum head. It is to be noted that this indexer tooling block configuration could have a slightly different style for each style of flange. However, the functional stages and operation of each tooling block would still be substantially the same due to the functions which are performed.

This pneumatic cylindrical and linkage arrangement 89 simply extends in a repetitive and sequential fashion a piston arm 120 with at least one block and pawl 101 at the end. The at least one pawl 101, or flange engaging or advancing member, is pinned so as to pivot and is in a normally-inclined downward position. In this position, the force vectors transmit the horizontal force from the pneumatic cylinder into a downward (45 degree angle) force through the pawl, which in turn is able to push against a portion of the corresponding flange so as to push it into position. The cylinder then retracts its arm and when this action occurs, the pawl 101, which is now being drawn back, is allowed to pivot upwardly so as not to actually pull back on any flange. The cylinder arm 120 and the cooperating pawl 101 are pulled back far enough so as to be in position for the next flange and then the forward movement of the arm repeats. As this forward movement repeats, the pawl 101 once again co-acts against the next flange in line, pushing it into position. This arrangement and sequence can be used for either of the two flange styles as shown in FIGS. 18 and 20.

At least in this area of the flange track, it is possible for one flange to ride up on and or over the next forward flange or what is described as "piggy-backing". One function of the side rails is to prevent piggy-backing. While it might be suggested to only have the side rails in this terminating section of the overall flange track because this is where the piggy-back risk is greatest, the side rails are useful throughout the entire length of the flange track. For instance, once piggy-backing starts at the downstream end of the flange track, the misalignment of flanges continues upstream and can adversely affect the operation of the pawl/cylinder pushing apparatus. For this reason, the side rails are preferably provided throughout the length of the flange track.

In another embodiment, two or more block and pawl combinations are mounted in sequence on the reciprocating cylinder arm. As the flanges are conveyed in a downstream direction, the first block and pawl combination engages the inside edge of the flange. Upon advancement of the arrangement, the flange is sequenced to a forward position. A second block and pawl combination is then activated to advance the flange into position for placement into the dies 65 and 66. In one embodiment, the second pawl is configured to engage the outside diameter of the cylinder body to facilitate insertion of the flange into the receiving pocket 71 of the mechanism 69. Preferably, the pawls 101 are mounted on a single body and reciprocate along a pair of rails.

In addition, a corresponding set of stops, such as spring mounted pivots 102a and 108a are provided between the various stages of the indexed flanges. As the flange conveyor is continually running, the first stop 108a holds the flange from advancing down stream until sequenced by the mechanism. Upon action of the first pawl 101, the flange is advanced over the first and second stops to the forward position. Once the flange is in the forward position, the second stop 102*a* prevents upstream motion of the flange as the second pawl 101 retracts. The second pawl may then engage the flange and place it into the die insertion mechanism 69. Stops 102*a* and 108*a* can be automatically retracted upon action of the arrangement, or the stops may be biased to retract by the force applied by the sequencing flanges. In addition, alternative configurations for stops 102*a* and 108*a* are contemplated, for example stops 102 and 108 (see FIGS. 22 and 23) can be substituted for either of 102*a* or 108*a*.

An alternative configuration for the indexer 89 is shown in FIGS. 21–23. Guide rails 122 are rigidly mounted above the flange track. The pusher cylinder 120, including its own guide rails 126, sequences an assembly along rails 122 between mounts 124. Front and rear pushers, 90 and 96 respectively, depend from the assembly in the same manner as did pawls 101, and front and rear stops 102 and 108 respectively operates as did stops 102*a* and 108*a* in FIGS. 19 and 20*a*.

Figure 24:
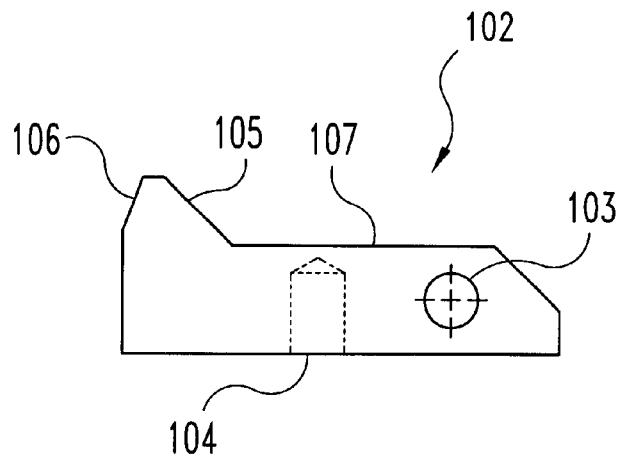
FIG. 24 is a side elevational view of the downstream pivot stop for the FIG. 21 indexing mechanism.
Figure 25:
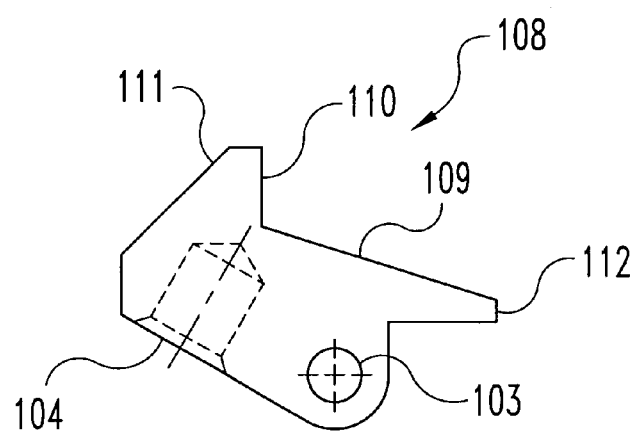
FIG. 25 is a side elevational view of the upstream pivot stop for the FIG. 21 indexing mechanism.

In this embodiment, front and rear stops 102 and 108 are differently configured as illustrated in FIGS. 24 and 25. Front stop 102 has a spring receiving hole 104 and pivots about mount 103. Stop 102 is generally flat along a top portion 107 and includes inclined portion 105 to activate spring at 104 as flanges are sequenced over stop 102. The front portion 106 is inclined at a greater angle than portion 105 to help prevent retraction of flanges over stop 102, as the assembly retracts in an upstream direction.

Figure 28:
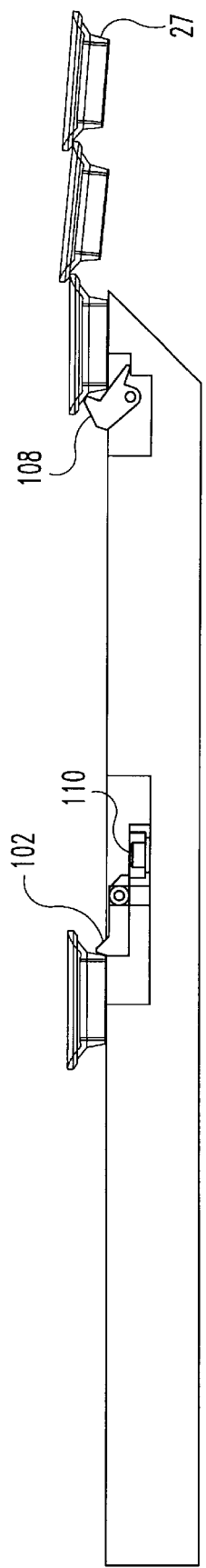
FIG. 28 is a side elevational view in partial section of the conveyor track section under the FIG. 21 indexing mechanism.

Stop 108 also has spring receiving portion 104 and pivot point 103. Moreover, stop 108 also includes flat portion 109 and inclined portion 110 much like portions 107 and 105 on stop 102. However, stop 108 also includes member 112 that is used to prevent over rotation of stop 108 in a clockwise direction, as shown in FIG. 25, by engaging a corresponding rigid portion on the flange track as shown in FIG. 28. Since the stop 108 is used to hold back a whole line of flanges, the spring mounted in hole 104 can be compressed when stop 108 is otherwise relaxed (i.e. no flange is being sequenced) to allow greater holding force on the line of flanges.

As also shown in FIG. 28, front stop 102 is preferably mounted in flange track by an adjustable bolt assembly 110 to allow upstream or downstream adjustment of stop 102, such as may be required when setting up the machine or when converting from running a first flange style to a second flange style. Though the relative position of stop 102 is adjustable, there is generally no need to make any changes in the stops 102 and 108 when converting the machine from running a first flange style to a second flange style, and consequently cost and time savings are gained here as well.

While stops 102 and 108 are illustrated singly on the bottom portion of the flange track, it is also possible to orient the stops elsewhere along the track or to provide additional stop members. For example, the stops can comprise retractable projections, such as flaps or spring-loaded balls, oppositely disposed along the sides of the flange track.

Figure 26D:
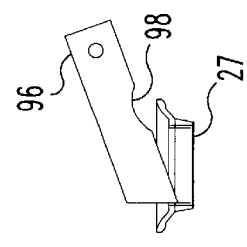
FIGS. 26A–D are side elevational views of the front and rear pushers of the FIG. 21 indexing mechanism cooperating with Type I and II vent flanges.
Figure 26C:
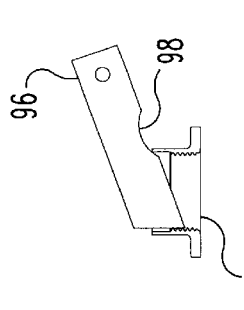
Figure 26B:
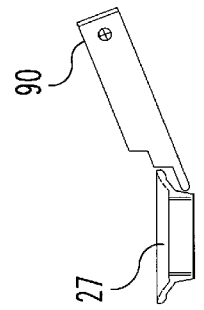
Figure 26A:
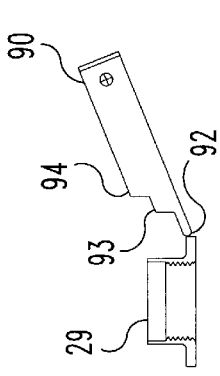

For the ¾ in vent flanges 29 and 27, front and rear pushers 90 and 96, or other flange engaging members, are configured as shown in FIGS. 26A–D. Front pusher 90 includes flange-engaging portion 92 for engaging the outer portion of flanges 29 and 27. As shown in FIG. 26A portion 92 engages the flared, octagonal base portion of flange 29. Pusher 89 can also be configured to cause portion 92 to engage the cylindrical body portion of flange 29 as well. As shown in FIG. 26B, portion 92 engages the outer cylindrical body of flange 27, and pusher 90 includes recessed portion 93 to accommodate the flared lip of flange 27. While recessed portion 93 can also contact flange 27 in operation, it is preferable configured such that portion 93 generally avoids the serrated lip of flange 27. Pusher 90 can additionally include a second flared portion next to main body 94.

With reference to FIGS. 26C, 26D rear pusher 96 is configured to engage the inner wall of the cylindrical body of flanges 29 and 27. Accordingly, pusher 96 includes depression 98 to accommodate the size and relative height differential between flange 29 and 27 without needing to make structural changes such as adjusting the height or location of any portion of the indexer assembly. With pusher 96 only engaging the inside wall of the flange, the indexer 89 is relatively unaffected by the condition of the flanges in the upstream portion. For example, the flanges can be piggy-backed, as is shown in FIG. 23, yet pusher 96 can precisely and accurately engage the appropriate flange to sequence it into a forward position for placement into the tooling block 70. In this embodiment, piggy-backing can be tolerated to some extent and consequently the exact configuration of the side rails is less important.

Figure 27D:
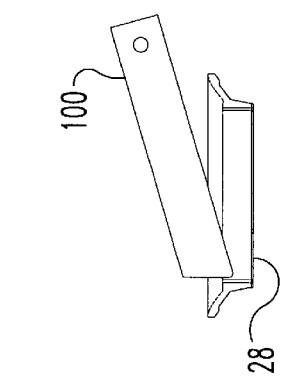
FIGS. 27A–D are side elevational views of the front and rear pushers of the FIG. 21 indexing mechanism cooperating with Type I and II outlet flanges.
Figure 27C:
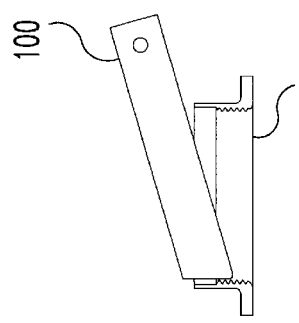
Figure 27B:
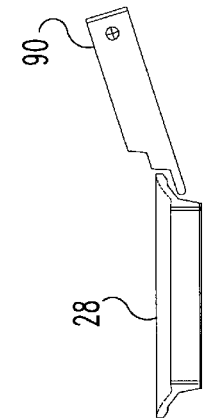
Figure 27A:
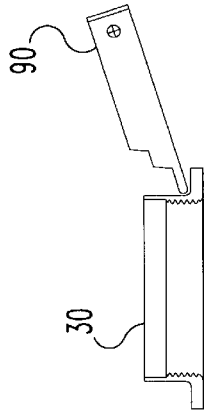

FIGS. 27A–D show the front and rear pushers 90 and 100 respectively for the indexer 89 for the conveyor of the 2 in outlet flanges 28 and 30. Pusher 90 is identical to the front pusher for the smaller flanges though it may be scaled up to accommodate the size differential. As shown in FIGS. 27A and B, the pusher 90 is configured to engage the outer cylindrical portion of both flange 28 and 30. Accordingly, piston 120 can sequence both flange 28 and 30 into their appropriate receiving pockets without requiring any modification to its stroke.

Pusher 100 is also similar to pusher 96 although it does not have a depression. Like pusher 96, pusher 100 provides the flexibility to accommodate flanges that are relatively piggy-backed without causing undue machine jams or handling problems.

While each of the pushers 90, 96, and 100 are shown singly and acting along the centerline of the flange, other configurations are contemplated. For example, the pushers can be configured to provide multiple engagement points along a surface of the flange, or multiple pushers per flange station depending from a single assembly can be used. Alternatively, the single block can be sectioned into two portions to independently operate each block and pawl combination.

In the illustrated embodiment, where the pushers 90, 96, and 100 on indexer 89 are the same whether running a first or second flange style, the need to make a structural change to the indexer 89 when converting is eliminated. The arrangement of the indexer 89, and the configuration of the pushers in particular, allows the indexer 89 to index the flanges to a desired location, such as into a locked position within their corresponding tooling blocks 70, without making substantial adjustments to the location or stroke of the indexer cylinder 120. In the illustrated embodiment, at least the 2 in flanges can be sequenced into their receiving pockets without making any change to the indexer whatsoever, and preferably the ¾ in flanges can be uniformly sequenced without structural changes as well.

Due to the variations between flange styles, each flange style might have a slightly different relevant outer dimension depending on where along the cylindrical diameter of the flange the front pusher 90 is made to engage each flange. For a fixed stroke of the cylinder 120, the flange style with the larger relevant dimension would tend to be indexed further downstream for the same stroke. While the front pusher 90 is configured to minimize the effect of any variation between flange styles, some minor adjustments might need to be made in conversion.

However, in the preferred embodiment, no substantial adjustment nor any structural adjustments need be made in converting the machine from running different flange styles. The indexer 89, and in particular the stroke of cylinder 120, is set to press the flange with the smaller relative outer dimension of the two flange styles into its corresponding receiving pocket 71. Without adjusting the location of the cylinder including the height of the pusher block assembly, and preferably without adjusting the pressure or desired stroke of the cylinder 120, the indexer 89 is then allowed to index flanges of the other style into their respective receiving pocket while running flanges according the second flange style. While the relative size differential between flange styles might result in the larger flange style being placed into the tooling block with slightly more force when the cylinder 120 is unadjusted, the successful insertion into the receiving pocket 71, and subsequent transport of flanges onto the tooling dies is unaffected.

In converting the insertion machine from a one-step procedure to a two-step procedure, or vice versa, fairly major changes have to be made to the upper and lower die tooling. In the one-step procedure, the die tooling is actually responsible for piercing and forming the hole and pocket in the drum head, both for the 2 inch flange and for the ¾ inch vent flange.

When the machine is configured for the two-step procedure, it is still convertible between the octagon type of flange and the serrated type of flange. In order to change the upper and lower die halves, the actual die portion that must be changed is received within a die tooling block which does not have to be changed. By making the interface the same between the actual die and the housing for the die, it is a relatively simple matter to simply loosen one bolt or fastener and take out the active die portion from the holder and insert a different die portion into that same holder. This arrangement is used for both the top and bottom die halves as the corresponding active tooling portions must be changed as well as being used for both the 2 inch and for the ¾ inch sizes.

Figure 31:
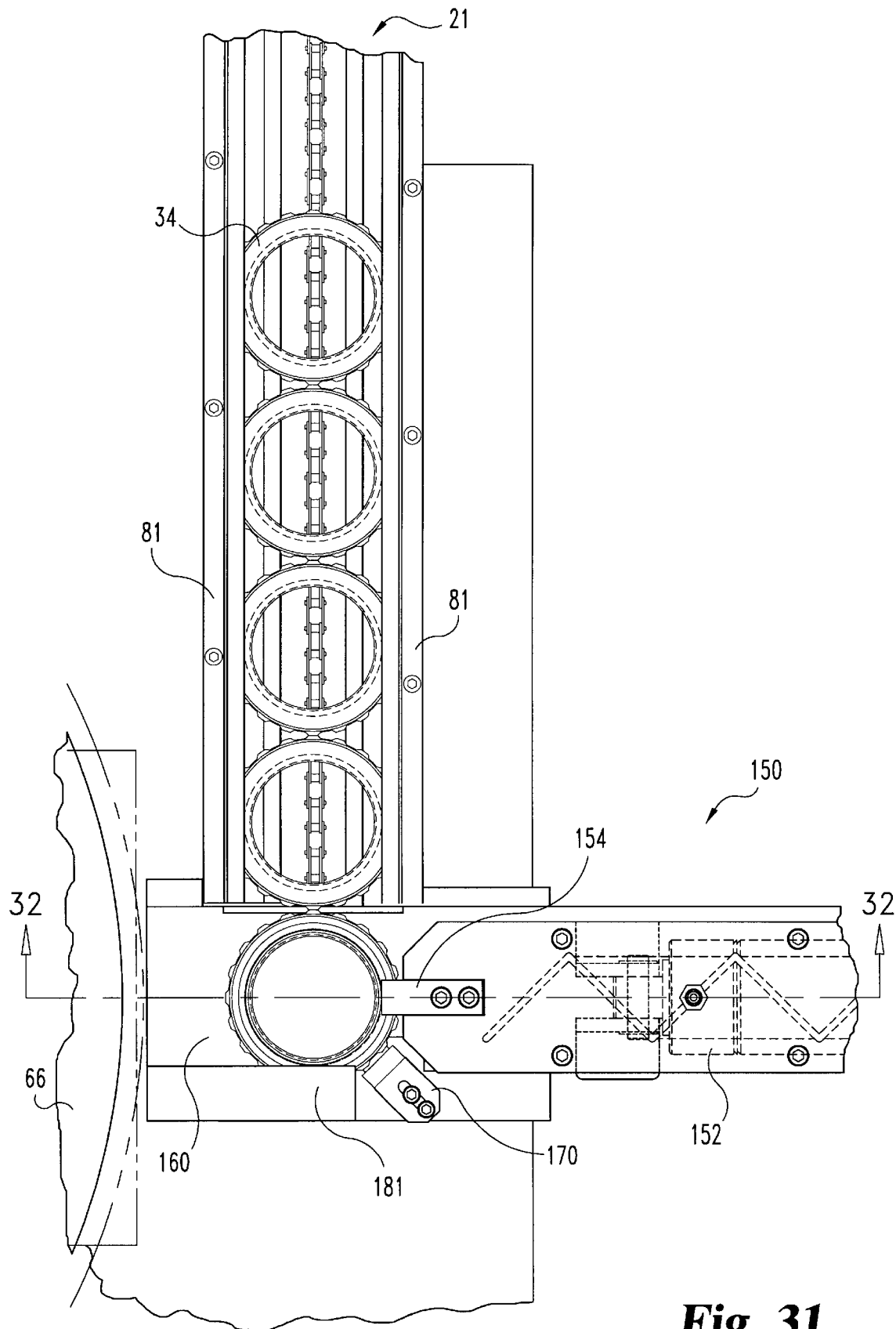
FIG. 31 is a top plan view of an alternative lateral transfer mechanism for a convertible flange insertion machine.

In still further embodiments, and in particular when the machine is configured for the two-step procedure, an alternative lateral transfer mechanism can be utilized in place of the lateral transfer mechanism comprising indexer 89 and mechanism 69 described above. Turning now to FIGS. 31 and 32, lateral transfer assembly 150 is illustrated. Assembly 150 takes the place of the feeder nose assembly 69 and indexer 89 in the embodiments described above. Whereas the feeder nose assembly 69 performed the lateral transfer of flanges by a pick and place motion, assembly 150 is positioned at the end of flange conveyor 21 and sequentially indexes flanges from conveyor 21 into tooling die 66.

Assembly 150 includes piston 152 that is operatively coupled to flange-engaging member 154 to push flanges across floor portion 160 and into die 66. After flanges 34 are conveyed down conveyor 21 in the conventional fashion, they enter portion 160 and are stopped by abutting against back rail 181. Sensor 170, which can be any conventional sensor such as a proximity sensor or a contact sensor, indicates the presence of a flange in portion 160. If die 66 is ready to receive a flange, cylinder 152 is activated to drive member 154 in a direction toward die 66. Member 154 actually contacts the flange and pushes flange 34 until it slides off of portion 160 and into die 66. Cylinder 152 then retracts member 154 to the position illustrated in FIGS. 31–32 to allow the the next flange to be advanced onto portion 160 by conveyor 21.

Conveyor 21 includes side rails 81 that each act to prevent or substantially eliminate piggy-backing and to ensure proper alignment of the flanges as they travel down conveyor 21. (See FIGS. 16–17) However, rails 81 each terminate at the entrance to portion 160 to allow the unobstructed lateral sliding motion of the flanges. Though side rails 81 terminate, back rail 181 is adapted to stop the downstream travel of flanges and to guide the flanges as they are placed between their respective die portions. In this fashion, back rail 181 has an identical profile as side rails 81 discussed above, such that back rail 181 can accomodate flanges according to both flange styles without modification.

Figure 32A:
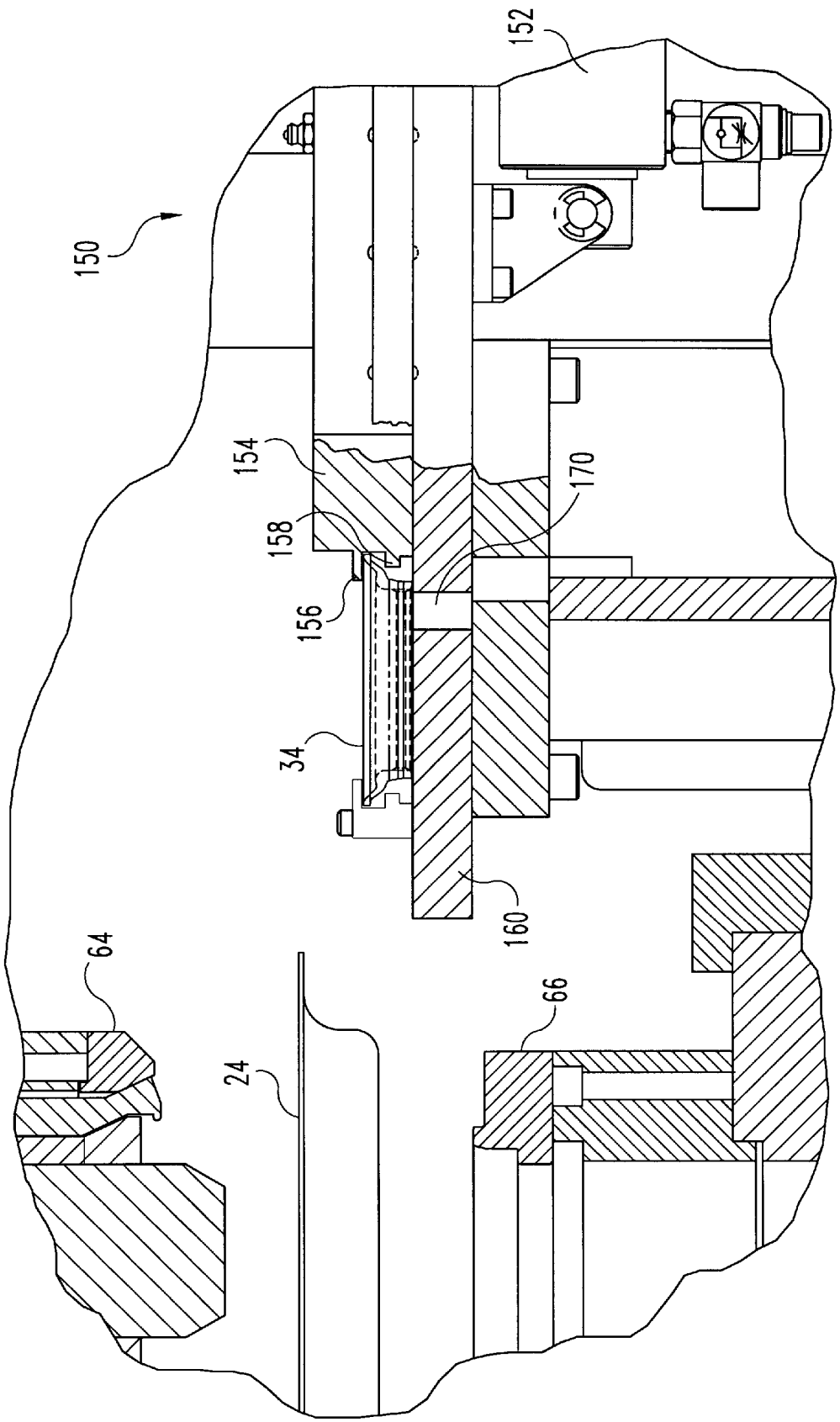
FIG. 32a is a side view in partial section of the lateral transfer mechanism of FIG. 31 in communication with a Type II flange.
Figure 32B:
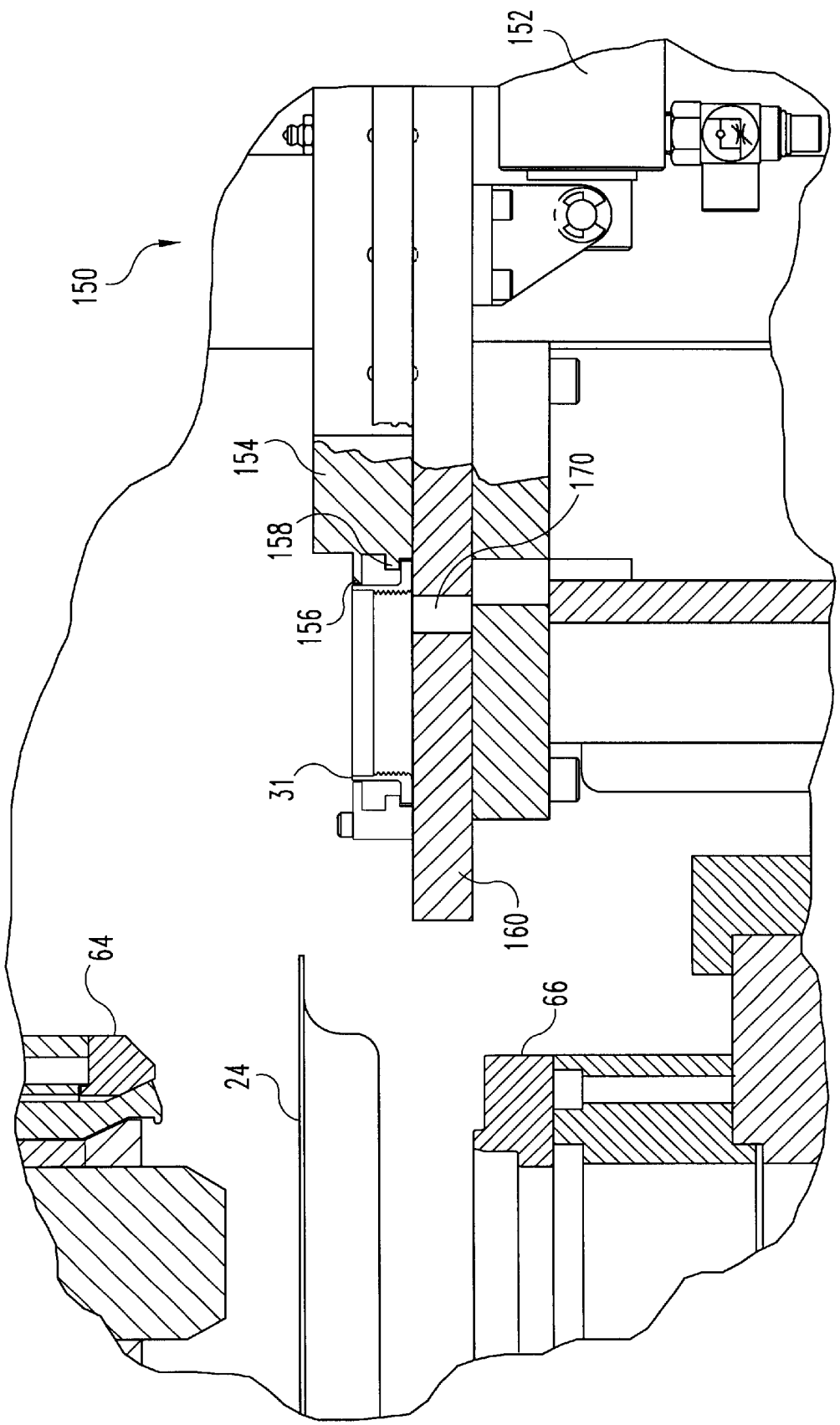
FIG. 32b is a side view in partial section of the lateral transfer mechanism of FIG. 31 in communication with a Type I flange.

In addition, as shown in FIGS. 32a and 32b, portion 154 includes a pair of lip members 156 and 158 for retaining the flared portion 35 and the octagonal base 32 of the different flanges without making any modifications to portion 154. As a flange is pushed off the edge of floor portion 160 and into die 66, the flange would have a tendency to tilt under the force of gravity once the leading edge of the flange slides a sufficient distance off of portion 160. To counteract this tilting tendency, lip members 156 and 158 are constructed to constrain the trailing edge of the flange as it is pushed off portion 160. In this way, the flange can more accurately be dropped and seated into die 66.

Figure 33:
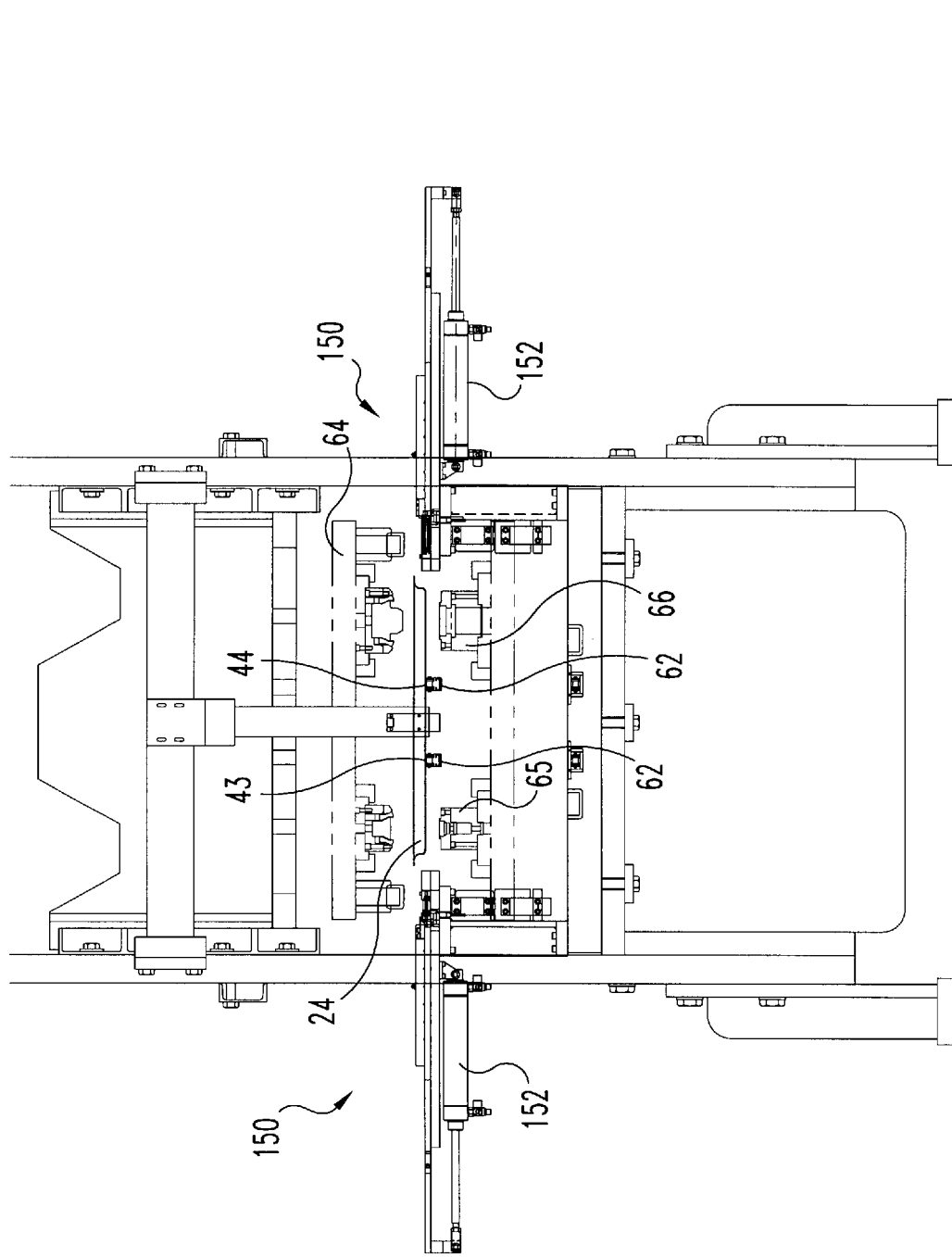
FIG. 33 is a diagrammatic, front elevational view of the rear or trailing end of a convertible flange insertion machine utilizing the FIG. 31 lateral transfer mechanism.
Figure 34:
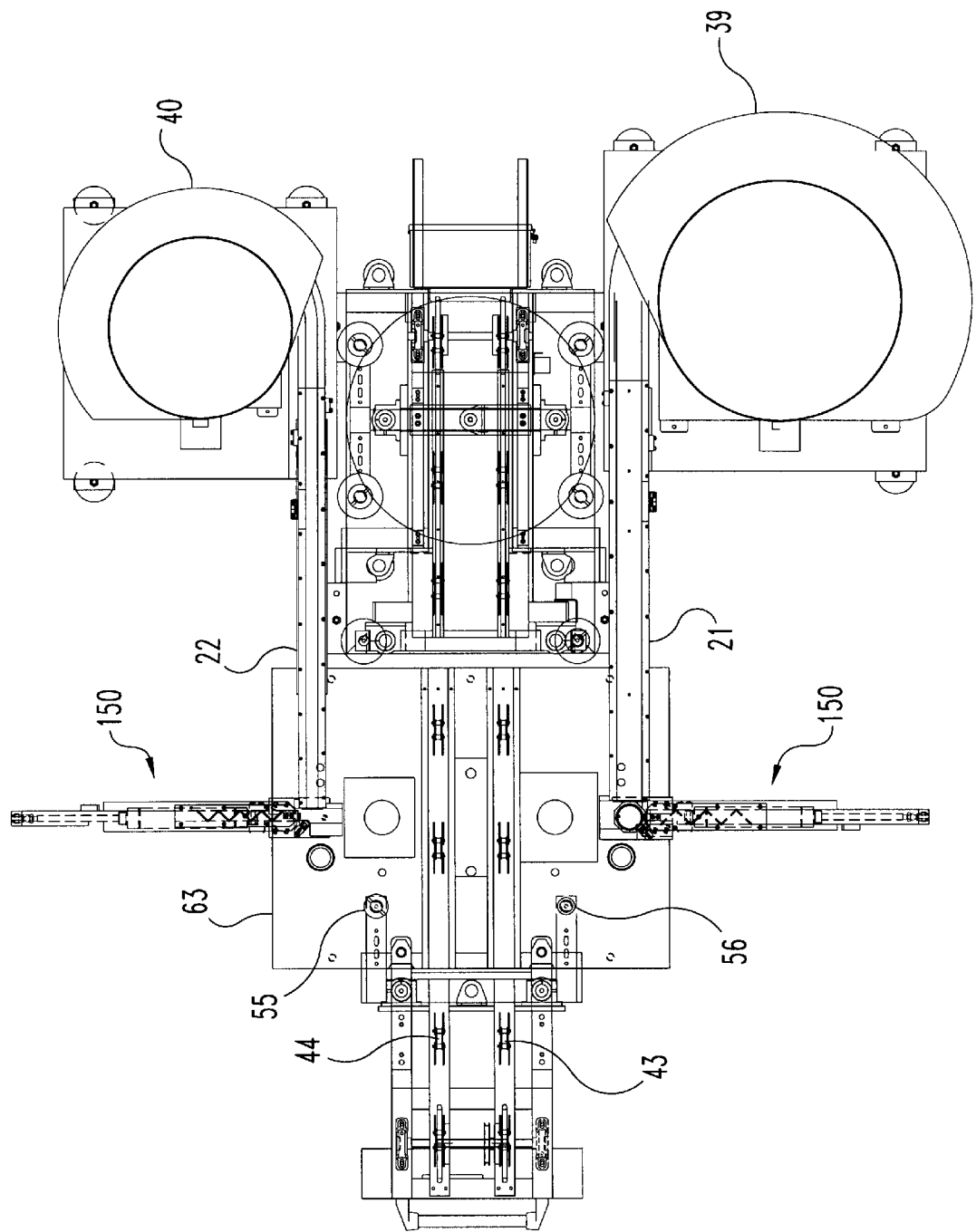
FIG. 34 is a diagrammatic, top plan view of the a convertible flange insertion machine utilizing the FIG. 31 lateral transfer mechanism.

FIGS. 33 and 34 show the convertible flange insertion machine 20, as depicted in FIGS. 2 and 10, save the substitution of the alternative lateral transfer mechanism 150 for indexer 89 and mechanism 69. As can be seen, a lateral transfer mechanism 150 is provided for each of the two flange conveyors with the presence and relative configuration of all the other elements, save indexer other elements remains the same. When converting the machine of FIGS. 33 and 34 from running a type I flange to running a type II flange, only the flanges and the actual die portions need by changed. While the stroke of cylinder 152 might require some minor adjustment in terms of distance or speed, no structural changes to mechanism 150 need by made in converting from running the two different flange styles.

As can be appreciated by those of skill in the art, in mechanism 150 a flange is pushed off the edge of floor 160 and allowed to fall a certain distance into die 66. Accordingly, it may be advantageous to configure die 66 with an enlarged tapered region surrounding the flange receiving pocket to facilitate catching the flange and assuring that it is seated properly in the die. Moreover, when the flange is pushed off edge 160 with some velocity so as to traverse the distance from the edge of portion 160 to the respective die portion 66, the tapered catching region would likely be more elongated in the direction of flange travel.

In other embodiments of mechanism 150, floor 160 can be adapted to move or extend out toward die portion 66 as flange is being pushed by portion 154. In this way, floor 160 would support the flange as the flange is being brought into position over the die portion 66. Either by retracting the floor or by pushing the flange with portion 154, the flange could then be dropped into the respective die.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A convertible, flange insertion machine for the installation of an internally-threaded flange into a drum head of a shipping container, said convertible, flange insertion machine comprising:
   a first conveyor for transport of a drum head to a flange insertion station;

a second conveyor for transport of a flange to said flange insertion station;

a tooling arrangement comprising a portion of said flange insertion station and including an upper tooling portion located on one side of said drum head and a lower tooling portion located on an opposite side of said drum head when said drum head is located at said flange insertion station;

wherein at least one of said upper and lower tooling portions is constructed and arranged to move toward said drum head for installation of said flange into said drum head; and said second conveyor including a first side rail which is constructed and arranged to guide said flange to said flange insertion station, said side rail being constructed and arranged to accommodate two different flange styles without the need to make any structural changes to said side rail when converting the machine from a first flange style to a second flange style;

wherein the first and second flange styles are structurally and dimension ally different.

2. The convertible flange insertion machine of claim 1 wherein said side rail has a profile, said profile defining a first lip member constructed and arranged to guide the flared portion of a flange according to the first flange style and a second lip member constructed and arranged to guide the flared portion of a flange according to the second flange style.

3. The convertible flange insertion machine of claim 2 wherein said first and second lip members define a channel for guiding a flange according to the second flange style.

4. The convertible flange insertion machine of claim 2 wherein said first and second lip members have portions that extend generally towards the centerline of said second conveyor, said portions being unequal distances from a plane defining the centerline of said conveyor.

5. The convertible flange insertion machine of claim 4 wherein at least one of said lip portions also guides the cylindrical body of a flange according to one of the flange styles.

6. The convertible flange insertion machine of claim 1 further comprising a second side rail.

7. The convertible flange insertion machine of claim 1 further comprising:

a lateral transfer mechanism comprising a portion of said flange insertion station, said lateral transfer mechanism adapted to transport a flange from said second conveyor to said tooling arrangement.

8. The convertible flange insertion machine of claim 7 further wherein:

said lateral transfer mechanism comprises a piston and a flange engaging member;

wherein said flange engaging member is constructed and arranged to accommodate two different flange styles without the need to make any structural changes to said flange engaging member when converting the machine from a first flange style to a second flange style.

9. The convertible flange insertion machine of claim 8 wherein:

said flange engaging member has a profile defining a least first and second lip members, said first and second lip members of said flange engaging member adapted to retain the flared portion of flanges according to the first and second flange styles respectively.

10. The convertible flange insertion machine of claim 1 wherein the first and second flange styles correspond to Type I and Type II flanges respectively.

11. The convertible flange insertion machine of claim 7 wherein:

said lateral transfer mechanism comprises an indexing arrangement for sequentially advancing flanges for insertion between said upper and lower tooling portions and comprising a portion of said flange insertion station, said indexing arrangement constructed and arranged to accommodate two different flange styles without the need to make any structural changes to said indexing arrangement when converting the machine from running a first flange style to running a second flange style.

12. The convertible flange insertion machine of claim 11 wherein:

said lateral transfer mechanism further comprises a tooling block driver for operating tooling block assemblies for receiving flanges from said indexing arrangement and inserting the flanges between said upper and lower tooling portions.

13. The convertible flange insertion machine of claim 1 wherein:

said tooling block driver is adapted to removably receive first and second tooling block assemblies;

said first tooling block assembly including a first receiving pocket adapted to receive flanges according to the first flange style; and said second tooling block assembly including a second receiving pocket adapted to receive flanges according to the second flange style.

14. The convertible flange insertion machine of claim 8 wherein the first and second flange styles correspond to Type I and Type II flanges respectively.

15. A convertible, flange insertion machine for the installation of an internally-threaded flange into a drum head of a shipping container, said convertible, flange insertion machine comprising:

a first conveyor for transport of a drum head to a flange insertion station;

a second conveyor for transport of a flange to said flange insertion station;

a tooling arrangement comprising a portion of said flange insertion station and including an upper tooling portion located on one side of said drum head and a lower tooling portion located on an opposite side of said drum head when said drum head is located at said flange insertion station;

wherein at least one of said upper and lower tooling portions is constructed and arranged to move toward said drum head for installation of said flange into said drum head; and an indexing arrangement for sequentially advancing flanges for insertion between said upper and lower tooling portions and comprising a portion of said flange insertion station, said indexing arrangement constructed and arranged to accommodate two different flange styles without the need to make any structural changes to said indexing arrangement when converting the machine from running a first flange style to running a second flange style;

wherein the first and second flange styles are structurally and dimension ally different.

16. The convertible flange insertion machine of claim 15 wherein said indexing arrangement advances flanges into a tooling block assembly for insertion between said upper and lower tooling portions, said indexing arrangement including a first flange advancing member, a second flange advancing member, a first flange stop, and a second flange stop.

17. The convertible flange insertion machine of claim 16 wherein said second flange advancing member engages the outer body surface of a flange when the flange is adjacent said second flange stop.

18. The convertible flange insertion machine of claim 17 wherein said first flange advancing member engages the inner body surface of a flange when the flange is adjacent said first flange stop.

19. The convertible flange insertion machine of claim 18 wherein said second flange advancing member includes a flange engaging portion and a recessed portion adjacent the flange engaging portion.

20. The convertible flange insertion machine of claim 19 wherein said recessed portion is configured to accommodate the flared portion of a flange according to one of the flange styles.

21. The convertible flange insertion machine of claim 15 wherein said indexing arrangement includes a piston coupled to at least one flange advancing member and adapted to travel between a first position and a second position, and wherein said piston is unaltered when converting from running a first to running a second flange style.

22. The convertible flange insertion machine of claim 21 wherein first and second flange advancing members are coupled to said cylinder.

23. The convertible flange insertion machine of claim 22 wherein said indexing arrangement includes a flange advancing member constructed and arranged to engage a flange according to the first flange style on the flange outer body surface and a flange according to the second flange style on the flange outer body surface without the need to make any structural changes to said flange engaging member when converting the machine from a first flange style to a second flange style.

24. The convertible flange insertion machine of claim 23 wherein said flange advancing member includes a flange engaging portion and a recessed portion adjacent the flange engaging portion to accommodate the flared portion of a flange according to one of the flange styles.

25. The convertible flange insertion machine of claim 15 wherein said second conveyor includes a side rail constructed and arranged to accommodate two different flange styles without the need to make any structural changes to said side rail when converting the machine from a first flange style to a second flange style.

26. The convertible flange insertion machine of claim 15 wherein:
said indexing arrangement comprises a lateral transfer mechanism adapted to transport a flange from said second conveyor to said tooling arrangement.

27. The convertible flange insertion machine of claim 26 wherein:
said lateral transfer mechanism comprises a piston adapted to sequence a flange engaging member;
wherein said flange engaging member is constructed and arranged to accommodate two different flange styles without the need to make any structural changes to said flange engaging member when converting the machine from a first flange style to a second flange style.

28. The convertible flange insertion machine of claim 27 wherein:
the stroke of said piston is not substantially modified when converting the machine from a first flange style to a second flange style.

29. The convertible flange insertion machine of claim 15 wherein the first and second flange styles correspond to Type I and Type II flanges respectively.

30. A method of installing internally threaded flanges into the drum head of a shipping container comprising:
providing a drum head conveyor for transport of a drum head to a flange insertion station;
providing a flange conveyor for transport of flanges according to two different flange styles to said flange insertion station;
providing a tooling arrangement comprising a portion of said flange insertion station and including an upper tooling portion located on one side of said drum head and a lower tooling portion located on an opposite side of said drum head when said drum head is located at said flange insertion station;
wherein at least one of said upper and lower tooling portions is constructed and arranged to move toward said drum head for installation of said flange into said drum head;
transporting a drum head to said flange insertion station on said drum head conveyor;
transporting a first flange according to a first flange style to said flange insertion station on said flange conveyor;
placing said first flange between said tooling portions;
inserting said flange into said drum head with said tooling arrangement;
transporting a second flange according to a second flange style to said flange insertion station on said flange conveyor without making any structural changes to said flange conveyor;
placing said second flange between said tooling portions;
inserting said second flange into a drum head with said tooling arrangement;
wherein the first and second flange styles are structurally and dimensionally different.

31. The method of claim 30 wherein said tooling portions are adapted to receive first and second flange style tooling dies for insertion of flanges according to said first and second flange styles respectively, the method further comprising changing said tooling dies from said first to said second flange style tooling dies prior to insertion of said second flange into a drum head.

32. The method of claim 30 wherein the first and second flange styles correspond to Type I and Type II flanges respectively.

33. A method comprising:
providing a convertible flange insertion machine for the installation of an internally-threaded flange into a drum head of a shipping container including:
a first conveyor for transport of a flange to said flange insertion station, and
a second conveyor for transport of a flange to said flange insertion station, and
a tooling arrangement comprising a portion of said flange insertion station and including an upper tooling portion located on one side of said drum head and a lower tooling portion located on an opposite side of said drum head when said drum head is located at said flange insertion station and wherein at least one of said upper and lower tooling portions is constructed and arranged to move toward said drum head for installation of said flange into said drum head,
wherein said second conveyor includes a first side rail which is constructed and arranged to guide said flanges to said flange insertion station without the need to make any structural changes to said side rail when converting the machine from running a first flange style to running a second structurally and dimensionally different flange style;

transporting a flange according to the first flange style on the second conveyor, and transporting a flange according to the second flange style on the second conveyor.

34. The method of claim 33 wherein said side rail has a profile, said profile defining a first lip member constructed and arranged to guide the flared portion of a flange according to the first flange style and a second lip member constructed and arranged to guide the flared portion of a flange according to the second flange style.

35. The method of claim 33 further comprising:

while transporting at least one flange according to the second style on the second conveyor, guiding the at least one flange with a channel defined by first and second lip members of said side rail.

36. The method of claim 33 further comprising:

while transporting at least one flange according to the first flange style on the second conveyor, guiding the cylindrical body of the flange with a first lip member of said side rail, wherein said side rail includes a second lip member that extends an unequal from a plane defining the centerline of said second conveyor than the first lip member.

37. The method of claim 33 further comprising:

transporting flanges from said second conveyor to said tooling arrangement with a lateral transfer mechanism.

38. The method of claim 37 wherein:

said lateral transfer mechanism comprises a position and a flange engaging member; and wherein said flange engaging member is constructed and arranged to accommodate the two different flange styles without the need to make any structural changes to said flange engaging member when converting the machine form a first flange style to a second flange style.

39. The method of claim 33 wherein the different flange styles correspond to Type I and Type II flanges.

40. A method comprising:

providing a convertible, flange insertion machine for the installation of an internally-threaded flange into a drum head of a shipping container including:

a first conveyor for transport of a drum head to a flange insertion station;

a second conveyor for transport of a flange to said insertion station;

a tooling arrangement comprising a portion of said flange insertion station and including an upper tooling portion located on one side of said drum head and a lower tooling portion located on an opposite side of said drum head when said drum head is located at said flange insertion, wherein at least one of said upper and lower tooling portion is constructed and arranged to move toward said drum head for installation of said flange into said drum head; and an indexing arrangement for sequentially advancing flanges for insertion between said upper and lower tooling portions and comprising a portion of said flange insertion station, said indexing arrangement constructed and arranged to accommodate first and second structurally and dimensionally different flange styles without the need to make any structural changes to said indexing arrangement when converting the machine from running the first flange style to running the second flange style;

advancing flanges according to the first flange style with said indexing arrangement, and advancing flanges according to the second flange style with said indexing arrangement.

41. The method of claim 40 wherein said indexing arrangement advances flanges into a tooling block assembly for insertion between said upper and lower tooling portions, said indexing arrangement including a first flange advancing member, a second flange advancing member, a first flange stop, and a second flange stop.

42. The method of claim 41 wherein said second flange advancing member engages the outer body surface of a flange when the flange is adjacent said second flange stop.

43. The method of claim 42 wherein said first flange advancing member engages the inner body surface of a flange when the flange is adjacent said first flange stop.

44. The method of claim 43 wherein said second flange advancing member includes a flange engaging portion and a recessed portion adjacent the flange engaging portion, and wherein said recessed portion is configured to accommodate the flared portion of a flange according to one of the flange styles.

45. The method of claim 40 wherein said indexing arrangement includes a piston coupled to at least one flange advancing member and adapted to travel between a first position and a second position, and wherein said piston is unaltered when converting from running the first to running the second flange style.

46. The method of claim 45 wherein the first and second flange advancing members are coupled to said cylinder.

47. The method of claim 46 wherein said indexing arrangement includes a flange advancing member constructed and arranged to engage a flange according to the first flange style on the flange outer body surface and a flange according to the second flange style on the flange outer body surface without the need to make any structural changes to said flange engaging member when converting the machine from the first flange style to the second flange style.

48. The method of claim 47 wherein said flange advancing member includes a flange engaging portion and a recessed portion adjacent the flange engaging portion to accommodate the flared portion of a flange according to one of the flange styles.

49. The method of claim 40 wherein said second conveyor includes a side rail constructed and arranged to accommodate two different flange styles without the need to make any structural changes to said side rail when converting the machine from the first flange style to the second flange style.

50. The method of claim 40 wherein:

said indexing arrangement comprises a lateral transfer mechanism adapted to transport a flange from said second conveyor to said tooling arrangement.

51. The method of claim 50 wherein:

said lateral transfer mechanism comprises a piston adapted to sequence a flange engaging member;

wherein said flange engaging member is constructed and arranged to accommodate the two different flange styles without the need to make any structural changes to said flange engaging member when converting the machine from the first flange style to the second flange style.

52. The method of claim 51 wherein:

the stroke of said piston is not substantially modified when converting the machine from the first flange style to the second flange style.

53. The method of claim 40 wherein the different flange styles correspond to Type I and Type II flanges.

\* \* \* \* \*

UNITED STATES PATENT AND TRADEMARK OFFICE
CERTIFICATE OF CORRECTION

PATENT NO.    : 6,418,608 B2  
DATED         : July 16, 2002  
INVENTOR(S)   : Glenn R. Keesler It is certified that error appears in the above-identified patent and that said Letters Patent is hereby corrected as shown below:

Column 21,  
Line 20, replace "dimension ally" with -- dimensionally --

Column 22,  
Line 63, replace "dimension ally" with -- dimensionally --

Column 25,  
Line 23, insert -- distance -- after "unequal"  
Line 29, replace "position" with -- piston --  
Line 35, replace "form" with -- from --

Signed and Sealed this

Twenty-fifth Day of February, 2003

JAMES E. ROGAN  
*Director of the United States Patent and Trademark Office*